(12) United States Patent
Rzeszutek et al.

(10) Patent No.: US 10,663,590 B2
(45) Date of Patent: May 26, 2020

(54) DEVICE AND METHOD FOR MERGING LIDAR DATA

(71) Applicant: SYMBOL TECHNOLOGIES, LLC, Lincolnshire, IL (US)

(72) Inventors: Richard Jeffrey Rzeszutek, Toronto (CA); Bradley M. Scott, Mississauga (CA)

(73) Assignee: Symbol Technologies, LLC, Holtsville, NY (US)

( * ) Notice: Subject to any disclaimer, the term of this patent is extended or adjusted under 35 U.S.C. 154(b) by 347 days.

(21) Appl. No.: 15/583,680

(22) Filed: May 1, 2017

(65) Prior Publication Data

US 2018/0313956 A1    Nov. 1, 2018

(51) Int. Cl.
| | |
|---|---|
| *G01S 17/00* | (2006.01) |
| *G01S 17/89* | (2020.01) |
| *G01S 7/00* | (2006.01) |
| *G01S 7/48* | (2006.01) |
| *G01S 17/87* | (2020.01) |
| *G01S 7/481* | (2006.01) |
| *G01S 17/02* | (2020.01) |
| *G01S 17/10* | (2020.01) |
| *G01S 17/42* | (2006.01) |

(52) U.S. Cl.
CPC .............. *G01S 17/89* (2013.01); *G01S 7/003* (2013.01); *G01S 7/4808* (2013.01); *G01S 7/4813* (2013.01); *G01S 17/023* (2013.01); *G01S 17/10* (2013.01); *G01S 17/42* (2013.01); *G01S 17/87* (2013.01)

(58) Field of Classification Search
USPC ........................................................ 356/5.01
See application file for complete search history.

(56) References Cited

U.S. PATENT DOCUMENTS

| 5,214,615 A | 5/1993 | Bauer |
| 5,408,322 A | 4/1995 | Hsu et al. |

(Continued)

FOREIGN PATENT DOCUMENTS

| CA | 2835830 | 11/2012 |
| CA | 3028156 | 1/2018 |

(Continued)

OTHER PUBLICATIONS

International Search Report and Written Opinion for International Patent Application No. PCT/US2013/070996 dated Apr. 2, 2014.

(Continued)

*Primary Examiner* — James R Hulka

(57) ABSTRACT

A device and method for merging lidar data is provided. Point cloud data is combined, via a lidar imaging controller, into a common point cloud data set, each set of point cloud data representing respective angular lidar scans of a region as at least two lidar devices are moved relative to the region of a shelf. The respective angular lidar scans from each lidar device occur at a non-zero and non-perpendicular angle to a movement direction. Common point cloud data set points are binned into a plane perpendicular to the movement direction of a mobile automation apparatus and extending from a virtual lidar position. The lidar imaging controller combines points among multiple planes.

19 Claims, 14 Drawing Sheets

(56) References Cited

U.S. PATENT DOCUMENTS

| | | | |
|---|---|---|---|
| 5,414,268 A | 5/1995 | McGee | |
| 5,534,762 A | 7/1996 | Kim | |
| 5,566,280 A | 10/1996 | Fukui et al. | |
| 5,953,055 A | 9/1999 | Huang et al. | |
| 5,988,862 A | 11/1999 | Kacyra et al. | |
| 6,026,376 A | 2/2000 | Kenney | |
| 6,034,379 A | 3/2000 | Bunte et al. | |
| 6,075,905 A | 6/2000 | Herman et al. | |
| 6,115,114 A | 9/2000 | Berg et al. | |
| 6,141,293 A | 10/2000 | Amorai-Moriya et al. | |
| 6,304,855 B1 | 10/2001 | Burke | |
| 6,442,507 B1 | 8/2002 | Skidmore et al. | |
| 6,580,441 B2 | 6/2003 | Schileru-Key | |
| 6,711,293 B1 | 3/2004 | Lowe | |
| 6,721,769 B1 | 4/2004 | Rappaport et al. | |
| 6,836,567 B1 | 12/2004 | Silver et al. | |
| 6,995,762 B1 | 2/2006 | Pavlidis et al. | |
| 7,046,273 B2 * | 5/2006 | Suzuki | H04N 5/232 348/153 |
| 7,090,135 B2 | 8/2006 | Patel | |
| 7,137,207 B2 | 11/2006 | Armstrong et al. | |
| 7,168,618 B2 * | 1/2007 | Schwartz | G06Q 20/208 235/383 |
| 7,233,699 B2 * | 6/2007 | Wenzel | G06K 9/6857 382/103 |
| 7,245,558 B2 | 7/2007 | Willins et al. | |
| 7,248,754 B2 | 7/2007 | Cato | |
| 7,277,187 B2 | 10/2007 | Smith et al. | |
| 7,373,722 B2 | 5/2008 | Cooper et al. | |
| 7,474,389 B2 | 1/2009 | Greenberg et al. | |
| 7,487,595 B2 | 2/2009 | Armstrong et al. | |
| 7,493,336 B2 | 2/2009 | Noonan | |
| 7,527,205 B2 | 5/2009 | Zhu et al. | |
| 7,605,817 B2 | 10/2009 | Zhang et al. | |
| 7,647,752 B2 | 1/2010 | Magnell | |
| 7,693,757 B2 | 4/2010 | Zimmerman | |
| 7,726,575 B2 | 6/2010 | Wang et al. | |
| 7,839,531 B2 | 11/2010 | Sugiyama | |
| 7,845,560 B2 | 12/2010 | Emanuel et al. | |
| 7,885,865 B2 | 2/2011 | Benson et al. | |
| 7,925,114 B2 | 4/2011 | Mai et al. | |
| 7,940,955 B2 * | 5/2011 | Zhang | G06K 9/3241 382/100 |
| 7,957,998 B2 | 6/2011 | Riley et al. | |
| 7,997,430 B2 * | 8/2011 | Clark | A47F 5/0025 211/186 |
| 8,009,864 B2 | 8/2011 | Linaker et al. | |
| 8,049,621 B1 | 11/2011 | Egan | |
| 8,091,782 B2 | 1/2012 | Cato et al. | |
| 8,094,902 B2 | 1/2012 | Crandall et al. | |
| 8,094,937 B2 | 1/2012 | Teoh et al. | |
| 8,132,728 B2 | 3/2012 | Dwinell et al. | |
| 8,134,717 B2 | 3/2012 | Pangrazio et al. | |
| 8,135,752 B2 * | 3/2012 | Basso | G06F 16/322 707/797 |
| 8,189,855 B2 | 5/2012 | Opalach et al. | |
| 8,199,977 B2 | 6/2012 | Krishnaswamy et al. | |
| 8,207,964 B1 | 6/2012 | Meadow et al. | |
| 8,233,055 B2 | 7/2012 | Matsunaga et al. | |
| 8,265,895 B2 | 9/2012 | Willins et al. | |
| 8,284,988 B2 | 10/2012 | Sones et al. | |
| 8,353,457 B2 * | 1/2013 | Olmstead | G06K 7/10861 235/462.41 |
| 8,423,431 B1 | 4/2013 | Rouaix et al. | |
| 8,429,004 B2 | 4/2013 | Hamilton et al. | |
| 8,456,518 B2 * | 6/2013 | Pace | H04N 13/296 348/47 |
| 8,463,079 B2 | 6/2013 | Ackley et al. | |
| 8,479,996 B2 | 7/2013 | Barkan et al. | |
| 8,520,067 B2 | 8/2013 | Ersue | |
| 8,542,252 B2 | 9/2013 | Perez et al. | |
| 8,570,343 B2 * | 10/2013 | Halstead | G06T 15/04 345/419 |
| 8,599,303 B2 | 12/2013 | Stettner | |
| 8,600,589 B2 * | 12/2013 | Mendez-Rodriguez | G01S 17/89 701/16 |
| 8,630,924 B2 | 1/2014 | Groenevelt et al. | |
| 8,660,338 B2 | 2/2014 | Ma et al. | |
| 8,670,619 B2 * | 3/2014 | Funayama | G06K 9/4671 382/190 |
| 8,693,725 B2 * | 4/2014 | Bobbitt | B61L 17/00 382/103 |
| 8,706,293 B2 * | 4/2014 | Lu | G07F 9/026 221/133 |
| 8,737,168 B2 * | 5/2014 | Somasundaram | H05K 7/1498 367/127 |
| 8,743,176 B2 | 6/2014 | Stettner et al. | |
| 8,757,479 B2 | 6/2014 | Clark et al. | |
| 8,773,946 B2 * | 7/2014 | Padmanabhan | G01C 15/00 367/7 |
| 8,812,226 B2 | 8/2014 | Zeng | |
| 8,842,496 B2 * | 9/2014 | Vartanian | G01S 15/08 367/128 |
| 8,923,893 B2 | 12/2014 | Austin et al. | |
| 8,939,369 B2 | 1/2015 | Olmstead et al. | |
| 8,941,645 B2 * | 1/2015 | Grimaud | G06Q 10/087 345/419 |
| 8,954,188 B2 | 2/2015 | Sullivan et al. | |
| 8,971,637 B1 | 3/2015 | Rivard | |
| 8,989,342 B2 | 3/2015 | Liesenfelt et al. | |
| 9,007,601 B2 | 4/2015 | Steffey et al. | |
| 9,033,239 B2 * | 5/2015 | Winkel | G06Q 10/087 235/383 |
| 9,064,394 B1 | 6/2015 | Trundle | |
| 9,070,285 B1 | 6/2015 | Ramu et al. | |
| 9,109,877 B2 * | 8/2015 | Thierman | G01C 15/002 |
| 9,129,277 B2 | 9/2015 | MacIntosh | |
| 9,135,491 B2 | 9/2015 | Morandi et al. | |
| 9,158,988 B2 * | 10/2015 | Patel | G06K 9/4604 |
| 9,159,047 B2 | 10/2015 | Winkel | |
| 9,165,383 B1 * | 10/2015 | Mendez-Rodriguez | G06T 11/001 |
| 9,171,442 B2 | 10/2015 | Clements | |
| 9,329,269 B2 | 5/2016 | Zeng | |
| 9,349,076 B1 | 5/2016 | Liu et al. | |
| 9,367,831 B1 | 6/2016 | Besehanic | |
| 9,380,222 B2 | 6/2016 | Clayton et al. | |
| 9,396,554 B2 | 7/2016 | Williams et al. | |
| 9,400,170 B2 | 7/2016 | Steffey | |
| 9,418,352 B2 * | 8/2016 | Lortz | G06Q 10/087 |
| 9,424,482 B2 | 8/2016 | Patel et al. | |
| 9,473,747 B2 * | 10/2016 | Kobres | G06Q 30/00 |
| 9,525,976 B2 * | 12/2016 | Dharwada | H04W 4/33 |
| 9,549,125 B1 | 1/2017 | Goyal et al. | |
| 9,562,971 B2 | 2/2017 | Shenkar et al. | |
| 9,565,400 B1 | 2/2017 | Curlander et al. | |
| 9,600,731 B2 | 3/2017 | Yasunaga et al. | |
| 9,600,892 B2 | 3/2017 | Patel et al. | |
| 9,639,935 B1 | 5/2017 | Douady-Pleven et al. | |
| 9,697,429 B2 | 7/2017 | Patel et al. | |
| 9,703,179 B2 * | 7/2017 | Bonner | G09F 19/18 |
| 9,706,105 B2 * | 7/2017 | Super | H04N 5/23216 |
| 9,778,388 B1 | 10/2017 | Connor | |
| 9,785,898 B2 * | 10/2017 | Hofman | G06Q 10/06 |
| 9,791,862 B1 | 10/2017 | Connor | |
| 9,805,240 B1 | 10/2017 | Zheng et al. | |
| 9,811,754 B2 | 11/2017 | Schwartz | |
| 9,827,683 B1 | 11/2017 | Hance et al. | |
| 9,886,678 B2 * | 2/2018 | Yan | G06Q 10/087 |
| 9,928,708 B2 | 3/2018 | Lin et al. | |
| 10,019,803 B2 | 7/2018 | Venable et al. | |
| 10,127,438 B1 | 11/2018 | Fisher et al. | |
| 10,182,223 B2 * | 1/2019 | Gharib | H04N 13/207 |
| 10,229,386 B2 | 3/2019 | Thomas | |
| 10,265,871 B2 | 4/2019 | Hance et al. | |
| 10,296,950 B2 * | 5/2019 | Vigier | G06Q 30/0281 |
| 2001/0041948 A1 | 11/2001 | Ross et al. | |
| 2002/0006231 A1 | 1/2002 | Jayant et al. | |
| 2002/0097439 A1 | 7/2002 | Braica | |
| 2002/0158453 A1 | 10/2002 | Levine | |
| 2002/0164236 A1 | 11/2002 | Fukuhara et al. | |

(56) References Cited

U.S. PATENT DOCUMENTS

| | | |
|---|---|---|
| 2003/0003925 A1 | 1/2003 | Suzuki |
| 2003/0174891 A1 | 9/2003 | Wenzel et al. |
| 2004/0114184 A1* | 6/2004 | Sugiyama .......... H04N 1/00957 358/1.18 |
| 2004/0131278 A1 | 7/2004 | Imagawa et al. |
| 2004/0240754 A1 | 12/2004 | Smith et al. |
| 2005/0006477 A1* | 1/2005 | Patel ................. G06K 7/10811 235/462.24 |
| 2005/0016004 A1 | 1/2005 | Armstrong et al. |
| 2005/0021561 A1* | 1/2005 | Noonan ............... G06Q 10/087 |
| 2005/0114059 A1 | 5/2005 | Chang et al. |
| 2005/0213082 A1 | 9/2005 | DiBernardo et al. |
| 2005/0213109 A1 | 9/2005 | Schell et al. |
| 2005/0256726 A1* | 11/2005 | Benson .............. G06Q 10/0637 705/28 |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0184013 A1* | 8/2006 | Emanuel ................. G01S 5/16 600/426 |
| 2007/0074410 A1 | 4/2007 | Armstrong et al. |
| 2007/0272732 A1 | 11/2007 | Hindmon |
| 2008/0025565 A1 | 1/2008 | Zhang et al. |
| 2008/0077511 A1* | 3/2008 | Zimmerman .......... G06Q 10/00 705/28 |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0238919 A1 | 10/2008 | Pack |
| 2008/0294487 A1 | 11/2008 | Nasser |
| 2009/0009123 A1 | 1/2009 | Skaff |
| 2009/0019916 A1* | 1/2009 | Ersue ................. G01B 11/002 73/1.79 |
| 2009/0024353 A1 | 1/2009 | Lee et al. |
| 2009/0057411 A1 | 3/2009 | Madej et al. |
| 2009/0059270 A1* | 3/2009 | Opalach ................. G06K 9/00 358/1.15 |
| 2009/0060349 A1* | 3/2009 | Linaker .............. G06K 9/00664 382/209 |
| 2009/0063306 A1 | 3/2009 | Fano et al. |
| 2009/0063307 A1* | 3/2009 | Groenovelt .......... G06Q 10/087 705/28 |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0121017 A1* | 5/2009 | Cato ................... G06Q 10/087 235/385 |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0323121 A1 | 12/2009 | Valkenburg et al. |
| 2010/0007761 A1* | 1/2010 | Matsunaga ............ H04N 5/232 348/222.1 |
| 2010/0020097 A1* | 1/2010 | Mai .................... G06T 3/4038 345/629 |
| 2010/0026804 A1 | 2/2010 | Tanizaki et al. |
| 2010/0070365 A1 | 3/2010 | Siotia et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0011936 A1* | 1/2011 | Morandi ................ G06K 9/00 235/454 |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0221882 A1* | 9/2011 | Crandall .............. G02B 21/002 348/79 |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | Volkmann et al. |
| 2012/0075342 A1 | 3/2012 | Choubassi et al. |
| 2012/0127314 A1* | 5/2012 | Clements ............ G08B 13/246 348/150 |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0020391 A1* | 1/2013 | Olmstead ........... G06K 7/10722 235/438 |
| 2013/0030700 A1 | 1/2013 | Miller et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller et al. |
| 2013/0154802 A1 | 6/2013 | D'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahern et al. |
| 2013/0235165 A1 | 9/2013 | Gharib et al. |
| 2013/0236089 A1 | 9/2013 | Litvak et al. |
| 2013/0245810 A1* | 9/2013 | Sullivan ................ G06Q 10/08 700/214 |
| 2013/0278631 A1 | 10/2013 | Border et al. |
| 2013/0282208 A1* | 10/2013 | Mendez-Rodriguez ..................... G01S 17/89 701/16 |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0016832 A1 | 1/2014 | Kong et al. |
| 2014/0019311 A1 | 1/2014 | Tanaka |
| 2014/0028837 A1 | 1/2014 | Gao et al. |
| 2014/0045515 A1* | 2/2014 | Austin ................. H04W 4/029 455/456.1 |
| 2014/0047342 A1 | 2/2014 | Breternitz et al. |
| 2014/0049616 A1 | 2/2014 | Stettner |
| 2014/0052555 A1* | 2/2014 | MacIntosh .......... G06Q 20/208 705/23 |
| 2014/0086483 A1 | 3/2014 | Zhang et al. |
| 2014/0098094 A1 | 4/2014 | Neumann et al. |

(56) References Cited

U.S. PATENT DOCUMENTS

| | | | |
|---|---|---|---|
| 2014/0100813 A1 | 4/2014 | Shaowering | |
| 2014/0104413 A1 | 4/2014 | McCloskey et al. | |
| 2014/0152874 A1* | 6/2014 | Clayton | G06T 5/50 |
| | | | 348/239 |
| 2014/0156133 A1 | 6/2014 | Cullinane et al. | |
| 2014/0192050 A1 | 7/2014 | Qiu et al. | |
| 2014/0195374 A1 | 7/2014 | Bassemir et al. | |
| 2014/0214547 A1 | 7/2014 | Signorelli et al. | |
| 2014/0267614 A1 | 9/2014 | Ding et al. | |
| 2014/0267688 A1 | 9/2014 | Aich et al. | |
| 2014/0277691 A1 | 9/2014 | Jacobus et al. | |
| 2014/0277692 A1 | 9/2014 | Buzan et al. | |
| 2014/0300637 A1 | 10/2014 | Fan et al. | |
| 2014/0324642 A1* | 10/2014 | Winkel | G06Q 10/087 |
| | | | 705/28 |
| 2014/0344401 A1 | 11/2014 | Varney et al. | |
| 2014/0351073 A1 | 11/2014 | Murphy et al. | |
| 2014/0369607 A1 | 12/2014 | Patel et al. | |
| 2015/0015602 A1 | 1/2015 | Beaudoin | |
| 2015/0019391 A1 | 1/2015 | Kumar et al. | |
| 2015/0029339 A1 | 1/2015 | Kobres et al. | |
| 2015/0039458 A1 | 2/2015 | Reid | |
| 2015/0088618 A1 | 3/2015 | Basir et al. | |
| 2015/0088703 A1 | 3/2015 | Yan | |
| 2015/0092066 A1 | 4/2015 | Geiss et al. | |
| 2015/0106403 A1 | 4/2015 | Haverinen et al. | |
| 2015/0117788 A1 | 4/2015 | Patel et al. | |
| 2015/0154467 A1 | 6/2015 | Feng et al. | |
| 2015/0161793 A1 | 6/2015 | Takahashi | |
| 2015/0170256 A1 | 6/2015 | Pettyjohn et al. | |
| 2015/0181198 A1 | 6/2015 | Baele et al. | |
| 2015/0262116 A1 | 9/2015 | Katircioglu et al. | |
| 2015/0279035 A1 | 10/2015 | Wolski et al. | |
| 2015/0298317 A1 | 10/2015 | Wang et al. | |
| 2015/0352721 A1 | 12/2015 | Wicks et al. | |
| 2015/0363625 A1 | 12/2015 | Wu et al. | |
| 2015/0363758 A1 | 12/2015 | Wu et al. | |
| 2015/0379704 A1 | 12/2015 | Chandrasekar et al. | |
| 2016/0026253 A1 | 1/2016 | Bradski et al. | |
| 2016/0044862 A1 | 2/2016 | Kocer | |
| 2016/0061591 A1 | 3/2016 | Pangrazio et al. | |
| 2016/0070981 A1 | 3/2016 | Sasaki et al. | |
| 2016/0092943 A1 | 3/2016 | Vigier et al. | |
| 2016/0012588 A1 | 4/2016 | Taguchi et al. | |
| 2016/0104041 A1 | 4/2016 | Bowers et al. | |
| 2016/0107690 A1 | 4/2016 | Oyama et al. | |
| 2016/0112628 A1 | 4/2016 | Super et al. | |
| 2016/0132815 A1 | 5/2016 | Itoko et al. | |
| 2016/0150217 A1 | 5/2016 | Popov | |
| 2016/0156898 A1 | 6/2016 | Ren et al. | |
| 2016/0163067 A1 | 6/2016 | Williams et al. | |
| 2016/0170089 A1* | 6/2016 | Collins | G01S 17/89 |
| | | | 702/5 |
| 2016/0170090 A1* | 6/2016 | Collins | G01V 99/005 |
| | | | 702/5 |
| 2016/0171707 A1 | 6/2016 | Schwartz | |
| 2016/0191759 A1 | 6/2016 | Somanath et al. | |
| 2016/0253735 A1 | 9/2016 | Scudillo et al. | |
| 2016/0328618 A1* | 11/2016 | Patel | G06K 9/4604 |
| 2016/0353099 A1 | 12/2016 | Thomson et al. | |
| 2017/0004649 A1 | 1/2017 | Collet Romea et al. | |
| 2017/0011281 A1 | 1/2017 | Dijkman et al. | |
| 2017/0011308 A1 | 1/2017 | Sun et al. | |
| 2017/0032311 A1 | 2/2017 | Rizzolo et al. | |
| 2017/0041553 A1 | 2/2017 | Cao et al. | |
| 2017/0066459 A1 | 3/2017 | Singh | |
| 2017/0074659 A1 | 3/2017 | Giurgiu et al. | |
| 2017/0150129 A1 | 5/2017 | Pangrazio | |
| 2017/0193434 A1 | 7/2017 | Shah et al. | |
| 2017/0219338 A1 | 8/2017 | Brown et al. | |
| 2017/0227645 A1 | 8/2017 | Swope et al. | |
| 2017/0227647 A1 | 8/2017 | Balk | |
| 2017/0228885 A1 | 8/2017 | Baumgartner | |
| 2017/0261993 A1 | 9/2017 | Venable et al. | |
| 2017/0280125 A1 | 9/2017 | Brown et al. | |
| 2017/0286773 A1 | 10/2017 | Skaff et al. | |
| 2017/0286901 A1 | 10/2017 | Skaff et al. | |
| 2017/0323376 A1 | 11/2017 | Glaser et al. | |
| 2017/0364758 A1* | 12/2017 | Minster | G06K 9/00825 |
| 2018/0001481 A1 | 1/2018 | Shah et al. | |
| 2018/0005035 A1 | 1/2018 | Bogolea et al. | |
| 2018/0005176 A1 | 1/2018 | Williams et al. | |
| 2018/0020145 A1 | 1/2018 | Kotfis et al. | |
| 2018/0053091 A1 | 2/2018 | Savvides et al. | |
| 2018/0053305 A1 | 2/2018 | Gu et al. | |
| 2018/0101813 A1 | 4/2018 | Paat et al. | |
| 2018/0114183 A1 | 4/2018 | Howell | |
| 2018/0143003 A1 | 5/2018 | Clayton et al. | |
| 2018/0174325 A1 | 6/2018 | Fu et al. | |
| 2018/0204111 A1 | 7/2018 | Zadeh et al. | |
| 2018/0293442 A1 | 10/2018 | Fridental et al. | |
| 2018/0313956 A1 | 11/2018 | Rzeszutek et al. | |
| 2018/0314260 A1 | 11/2018 | Jen et al. | |
| 2018/0314908 A1 | 11/2018 | Lam | |
| 2018/0315007 A1 | 11/2018 | Kingsford et al. | |
| 2018/0315065 A1 | 11/2018 | Zhang et al. | |
| 2018/0315173 A1 | 11/2018 | Phan et al. | |
| 2018/0315865 A1 | 11/2018 | Haist et al. | |
| 2019/0057588 A1 | 2/2019 | Savvides et al. | |
| 2019/0065861 A1 | 2/2019 | Savvides et al. | |
| 2019/0073554 A1 | 3/2019 | Rzeszutek | |
| 2019/0180150 A1 | 6/2019 | Taylor et al. | |

FOREIGN PATENT DOCUMENTS

| | | |
|---|---|---|
| CN | 104200086 | 12/2014 |
| CN | 107067382 | 8/2017 |
| EP | 0766098 A1 | 4/1997 |
| EP | 1311993 B1 | 5/2007 |
| EP | 2309378 | 4/2011 |
| EP | 2439487 | 4/2012 |
| EP | 2472475 A1 | 7/2012 |
| EP | 2562688 | 2/2013 |
| EP | 2662831 A2 | 11/2013 |
| EP | 2693362 | 2/2014 |
| GB | 2323238 A | 9/1998 |
| GB | 2330265 A | 4/1999 |
| KR | 101234798 | 1/2009 |
| KR | 102019003143 1 | 3/2019 |
| WO | WO 2003002935 | 1/2003 |
| WO | 2003025805 A1 | 3/2003 |
| WO | 2006136958 A3 | 12/2006 |
| WO | 2007042251 A2 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | 2014181323 A1 | 11/2014 |
| WO | WO 2015127503 | 9/2015 |
| WO | WO 2016020038 | 2/2016 |
| WO | WO 2018018007 | 1/2018 |
| WO | WO 2019023249 | 1/2019 |

OTHER PUBLICATIONS

International Search Report and Written Opinion for International Patent Application No. PCT/US2013/053212 dated Dec. 1, 2014.

Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).

Bohm, "Multi-Image Fusion for Occlusion-Free Facade Texturing", International Archives of the Photogrammetry, Remote Sensing and Spatial Information Sciences, pp. 867-872 (Jan. 2004).

Senthilkumaran, et al., "Edge Detection Techniques for Image Segmentation—A Survey of Soft Computing Approaches", International Journal of Recent Trends in Engineering, vol. 1, No. 2 (May 2009).

(56) References Cited

OTHER PUBLICATIONS

Flores, et al., "Removing Pedestrians from Google Street View Images", Computer Vision and Pattern Recognition Workshops, 2010 IEEE Computer Society Conference On, IEE, Piscataway, NJ, pp. 53-58 (Jun. 13, 2010).
Uchiyama, et al., "Removal of Moving Objects from a Street-View Image by Fusing Multiple Image Sequences", Pattern Recognition, 2010, 20th International Conference On, IEEE, Piscataway, NJ, pp. 3456-3459 (Aug. 23, 2010).
Tseng, et al. "A Cloud Removal Approach for Aerial Image Visualization", International Journal of Innovative Computing, Information & Control, vol. 9 No. 6, pp. 2421-2440 (Jun. 2013).
United Kingdom Intellectual Property Office, Combined Search and Examination Report dated Mar. 11, 2015 for GB Patent Application No. 1417218.3.
United Kingdom Intellectual Property Office, Examination Report dated Jan. 22, 2016 for GB Patent Application No. 1417218.3 (2 pages).
United Kingdom Intellectual Property Office, Combined Search and Examination Report dated Jan. 22, 2016 for GB Patent Application No. 1521272.3 (6 pages).
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 15/211,103 dated Apr. 5, 2017.
Notice of allowance for U.S. Appl. No. 14/518,091 dated Apr. 12, 2017.
U.S. Appl. No. 15/583,717, filed May 1, 2017.
U.S. Appl. No. 15/583,801, filed May 1, 2017.
U.S. Appl. No. 15/583,740, filed May 1, 2017.
U.S. Appl. No. 15/583,759, filed May 1, 2017.
U.S. Appl. No. 15/583,773, filed May 1, 2017.
U.S. Appl. No. 15/583,786, filed May 1, 2017.
International Patent Application Serial No. PCT/CN2017/083143 filed May 5, 2017.
"Fair Billing with Automatic Dimensioning" pp. 1-4, undated, Copyright Mettler-Toledo International Inc.
"Plane Detection in Point Cloud Data" dated 2010-01-25 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applications (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Chen et al. "Improving Octree-Based Occupancy Maps Using Environment Sparsity with Application to Aerial Robot Navigation" Robotics and Automation (ICRA), 2017 IEEE International Conference on IEEE, pp. 3656-3663, 2017.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing" ACM SIGGRAPH Computer Graphics, vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algorithm for large noisy point clouds using filtered normals and voxel growing," 3DPVT, May 2010, Paris, France.
Douillard, Bertrand, et al. "On the segmentation of 3D LIDAR point clouds." Robotics and Automation (ICRA), 2011 IEEE International Conference on IEEE, 2011.
Dubois, M., et al., "A comparison of geometric and energy-based point cloud semantic segmentation methods," European Conference on Mobile Robots (ECMR), pp. 88-93, Sep. 25-27, 2013.
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds,"IEEE, 2016 Conference on Computer vision and Pattern recognition (CVPR), Jun. 27-30, 2016, pp. 1-9.
Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2019/025859 dated Jul. 3, 2019.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
Jadhav et al. "Survey on Spatial Domain dynamic template matching technique for scanning linear barcode," International Journal of scieve and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote

(56) References Cited

OTHER PUBLICATIONS sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp, 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 I9, pp. 1-20 (2016).
Norriof et al., "Experimental comparison of some classical iterative learning control algorithms", IEEE Transactions on Robotics and Automation, Jun. 2002, pp. 636-641.
Olson, Clark F., etal. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176181.
Park et al., "Autonomous mobile robot navigation using passiv rfid in indoor environment," IEEE, Transactions on industrial electronics, vol. 56, issue 7, pp. 23662373 (Jul. 2009).
Perveen et al. (An overview of template matching methodologies and its application, International Journal of Research in Computer and Communication Technology, v2n10, oct. 2013) (Year: 2013).

Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks,"In IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php].
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint,"International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=pdf, pp. 1-6.
United Kingdom Intellectual Property Office, "Combined Search and Examination Report" for GB Patent Application No. 1813580.6 dated Feb. 21, 2019.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.

\* cited by examiner

DEVICE AND METHOD FOR MERGING LIDAR DATA

CROSS-REFERENCE TO RELATED APPLICATIONS

This application is related to U.S. Provisional Application No. 62/492,670 entitled "Product Status Detection System," filed on May 1, 2017, by Perrella et al., which is incorporated herein by reference in its entirety.

BACKGROUND OF THE INVENTION

In retail environments, out of stock detection, low stock detection, price label verification, plug detection (SKU (stock keeping unit) in the wrong location) and planogram compliance (e.g. determining whether products on a "module" of shelving conform to specified plan), are common problems that are usually solved by dispatching human associates to physically check for issues in the store. For example, the associates visually assess the shelves for issues, and scan the "Shelf Label" barcodes to fetch relevant information regarding the product which is supposed to be on the shelf from the retailer's SKU database. However, such methods are both extremely labor intensive and error prone. Furthermore, the data generated by the human associates is often not in a machine-readable form and requires manual processing before the problem can be resolved, leading to delays in the resolution of the issues detected. This results in replacement stock not making it back onto the shelves in a timely manner, leading to lost sales and dissatisfied customers. While multiple lidar (Light Detection and Ranging) sensors on a mobile automation apparatus can be used to scan the shelves, such multiple lidar sensors are prone to their own issues. For example, the multiple lidar sensors will generally scan in a vertical direction, so depending on the speed of the mobile automation apparatus, gaps between stock items may not be detected. Furthermore, the multiple lidar sensors are generally arranged vertically on the mobile automation apparatus to maximize their vertical coverage of the shelves. While this minimizes the effect of objects blocking various lidar sensors' individual lines of sight, the shadows differ from lidar sensor to lidar sensor which makes combining the lidar sensor data challenging.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
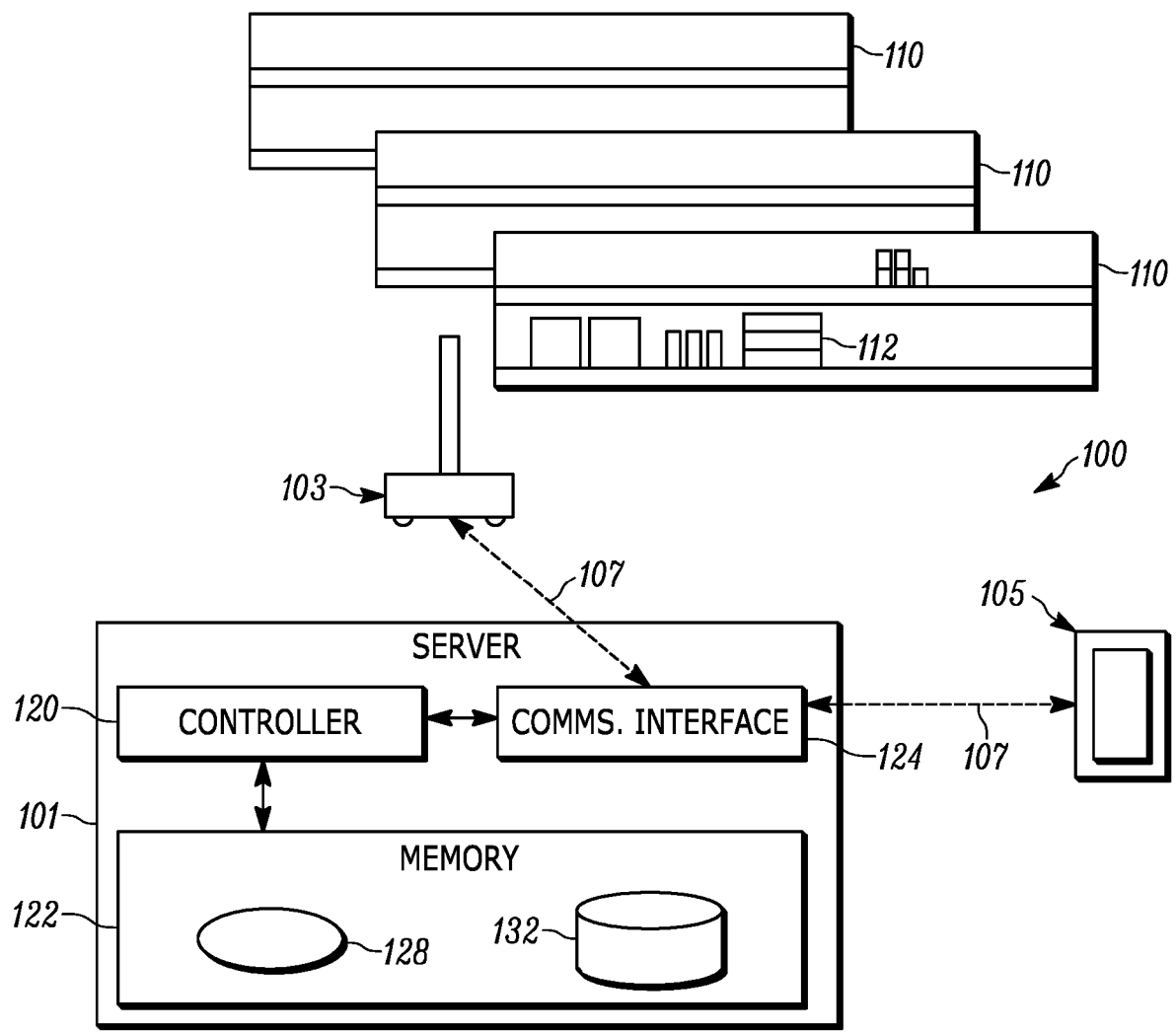
FIG. 1A is a block diagram of a mobile automation system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device comprising: a controller and a communication interface, the controller configured to: receive, via the communication interface, point cloud data representing respective angular lidar scans of a region as at least two lidar devices are moved relative the region, the respective angular lidar scans occurring at a non-zero and non-perpendicular angle to a movement direction; combine the point cloud data into a common point cloud data set; bin points from the common point cloud data set into a plane perpendicular to the movement direction and extending from a virtual lidar position relative to the common point cloud data set; while ignoring outlier points located behind closer points to the virtual lidar position, perform curve fitting on the closer points to smooth out noise from the closer points and produce curve fit points in the plane; and combine the curve fit points with other curve points from other planes extending from other virtual lidar positions along the movement direction into a virtual lidar scan of the region along the movement direction.

In some embodiments, the controller is further configured to combine the point cloud data into the common point cloud data set using navigational data of an apparatus moving the at least two lidar devices in the movement direction.

In some embodiments, the controller is further configured to bin the points from the common point cloud data set into the plane perpendicular to the movement direction using a threshold distance.

In some embodiments, the outlier points each comprise a point that is further away from the virtual lidar position than a respective closer point along a common line extending from the virtual lidar position to the point and the respective closer point.

In some embodiments, the virtual lidar position is located at a position between the at least two lidar devices relative to the common point cloud data set.

In some embodiments, the virtual lidar position is located at a position of a camera relative to the common point cloud data set. In some embodiments, the position of the camera is between the at least two lidar devices relative to the common point cloud data set. In some embodiments, the controller is further configured to compare the virtual lidar scan with camera data from the camera to determine positions of features in the region, the camera data comprising one or more images of the region acquired by the camera.

In some embodiments, each point of the plane is represented in polar coordinates.

Another aspect of the specification provides a method comprising: at a device comprising a controller and a communication interface, receiving, via the communication interface, point cloud data representing respective angular lidar scans of a region as at least two lidar devices are moved relative the region, the respective angular lidar scans occurring at a non-zero and non-perpendicular angle to a movement direction; combining, using the controller, the point cloud data into a common point cloud data set; binning, using the controller, points from the common point cloud data set into a plane perpendicular to the movement direction and extending from a virtual lidar position relative to the common point cloud data set; while ignoring outlier points located behind closer points to the virtual lidar position, performing, using the controller, curve fitting on the closer points to smooth out noise from the closer points and produce curve fit points in the plane; and combining, using the controller, the curve fit points with other curve points from other planes extending from other virtual lidar positions along the movement direction into a virtual lidar scan of the region along the movement direction.

In some embodiments, the method further comprises combining the point cloud data into the common point cloud data set using navigational data of an apparatus moving the at least two lidar devices in the movement direction.

In some embodiments, the method further comprises binning the points from the common point cloud data set into the plane perpendicular to the movement direction using a threshold distance.

In some embodiments, the outlier points each comprise a point that is further away from the virtual lidar position than a respective closer point along a common line extending from the virtual lidar position to the point and the respective closer point.

In some embodiments, the virtual lidar position is located at a position between the at least two lidar devices relative to the common point cloud data set.

In some embodiments, the virtual lidar position is located at a position of a camera relative to the common point cloud data set. In some embodiments, the position of the camera is between the at least two lidar devices relative to the common point cloud data set. In some embodiments, the method further comprises comparing the virtual lidar scan with camera data from the camera to determine positions of features in the region, the camera data comprising one or more images of the region acquired by the camera.

In some embodiments, each point of the plane is represented in polar coordinates.

Yet a further aspect of the specification provides a non-transitory computer-readable medium storing a computer program, wherein execution of the computer program is for: at a device comprising a controller and a communication interface, receiving, via the communication interface, point cloud data representing respective angular lidar scans of a region as at least two lidar devices are moved relative the region, the respective angular lidar scans occurring at a non-zero and non-perpendicular angle to a movement direction; combining, using the controller, the point cloud data into a common point cloud data set; binning, using the controller, points from the common point cloud data set into a plane perpendicular to the movement direction and extending from a virtual lidar position relative to the common point cloud data set; while ignoring outlier points located behind closer points to the virtual lidar position, performing, using the controller, curve fitting on the closer points to smooth out noise from the closer points and produce curve fit points in the plane; and combining, using the controller, the curve fit points with other curve points from other planes extending from other virtual lidar positions along the movement direction into a virtual lidar scan of the region along the movement direction.

FIG. 1A is a block diagram of a mobile automation system 100 in accordance with some embodiments, the system 100 comprising a server 101 in communication with a mobile automation apparatus 103 and at least one mobile device 105 using wireless links 107. The mobile automation apparatus 103 is interchangeably referred to hereafter as an apparatus 103. The server 101 comprises a controller 120 in communication with a memory 122 and a communication interface 124.

FIG. 1A depicts a mobile automation system 100 in accordance with the teachings of this disclosure. The system 100 includes a server 101 in communication with at least one mobile automation apparatus 103 (also referred to herein simply as the apparatus 103) and at least one mobile device 105 via communication links 107, illustrated in the present example as including wireless links. The system 100 is deployed, in the illustrated example, in a retail environment including a plurality of modules 110 of shelves each supporting a plurality of products 112. More specifically, the apparatus 103 is deployed within the retail environment, and at least periodically communicates with the server 101 (via the link 107) as it navigates the length of at least a portion of the modules 110. The apparatus 103 is equipped with a plurality of data capture sensors, such as image sensors (e.g. one or more digital cameras) and depth sensors (e.g. one or more lidar sensors), and is further configured to employ the sensors to capture shelf data. In the present example, the apparatus 103 is configured to capture a series of digital images of the modules 110, as well as a series of depth measurements, each describing the distance and direction between the apparatus 103 and a point associated with the module 110, such as the shelf module 110 itself or products disposed thereon.

The server 101 includes a special purpose lidar imaging controller 120 specifically designed to merge lidar data from lidar devices, at the mobile automation apparatus 103, scanning a module 110. The controller 120 is interconnected with a non-transitory computer readable storage medium, such as a memory 122. The memory 122 includes a suitable combination of volatile (e.g. Random Access Memory or RAM) and non-volatile memory (e.g. read only memory or ROM, Electrically Erasable Programmable Read Only Memory or EEPROM, flash memory). In general, the controller 120 and the memory 122 each comprise one or more integrated circuits. In an embodiment, the controller 120, further includes one or more central processing units (CPUs) and/or graphics processing units (GPUs). In an embodiment, to increase reliability and processing speed of high volume of lidar sensor data from the mobile automation apparatus 103, a specially designed integrated circuit, such as a Field Programmable Gate Array (FPGA), is designed to perform merging of lidar data discussed herein, either alternatively or in addition to the controller and memory 122. In such an embodiment, the control application 128, discussed in detail below, is an FPGA chip. As those of skill in the art will realize, the mobile automation apparatus 103 also includes one or more controllers or processors and/or FPGAs, in communication with the lidar imaging controller 120, specifically configured to control navigational and/or data capture aspects of the mobile automation apparatus either alternatively or in addition to the functionality of the lidar imaging controller 120 discussed herein.

The server 101 also includes a communications interface 124 interconnected with the controller 120. The communications interface 124 includes any suitable hardware (e.g. transmitters, receivers, network interface controllers and the like) allowing the server 101 to communicate with other computing devices—particularly the apparatus 103 and the mobile device 105—via the links 107. The links 107 may be direct links, or links that traverse one or more networks, including both local and wide-area networks. The specific components of the communications interface 124 are selected based on the type of network or other links that the server 101 is required to communicate over. In the present example, a wireless local-area network is implemented within the retail environment via the deployment of one or more wireless access points. The links 107 therefore include both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the controller 120. The execution of the above-mentioned instructions by the controller 120 configures the server 101 to perform various actions discussed herein. The applications stored in the memory 122 include a control application 128, which may also be implemented as a suite of logically distinct applications. In general, via execution of the control application 128 or subcomponents thereof, the controller 120 is configured to implement various functionality. The controller 120, as configured via the execution of the control application 128, is also referred to herein as the controller 120. As will now be apparent, some or all of the functionality implemented by the controller 120 described below may also be performed by preconfigured special purpose hardware elements (e.g. one or more ASICs) rather than by execution of the control application 128 by the controller 120.

In general, the controller 120 is configured to at least periodically communicate with the mobile automation apparatus 103, which autonomously navigates the environment and captures data, to obtain the captured data via the communications interface 124 and store the captured data in a repository 132 of the memory 122. The server 101 is further configured to perform various post-processing operations on the captured data, and to detect the status of the products 112 on the modules 110. When certain status indicators are detected, the server 101 is also configured to transmit status notifications to the mobile device 105.

For example, in some embodiments, the server 101 is configured via the execution of the control application 128 by the controller 120, to process image and depth data captured by the apparatus 103 to identify portions of the captured data depicting a back of a module 110, and to detect gaps between the products 112 based on those identified portions. In some embodiments navigation of the mobile automation apparatus is fully autonomous, while in other embodiments the server 101 facilitates navigation of the mobile automation apparatus 103 by providing a map and/or paths and/or path segments and/or navigation data and/or navigation instructions to the apparatus 103 to help the apparatus 103 navigate among the modules 110.

In the present example, the server 101 is configured via the execution of the control application 128 by the controller 320, to merge lidar data as described hereafter.

Figure 1B:
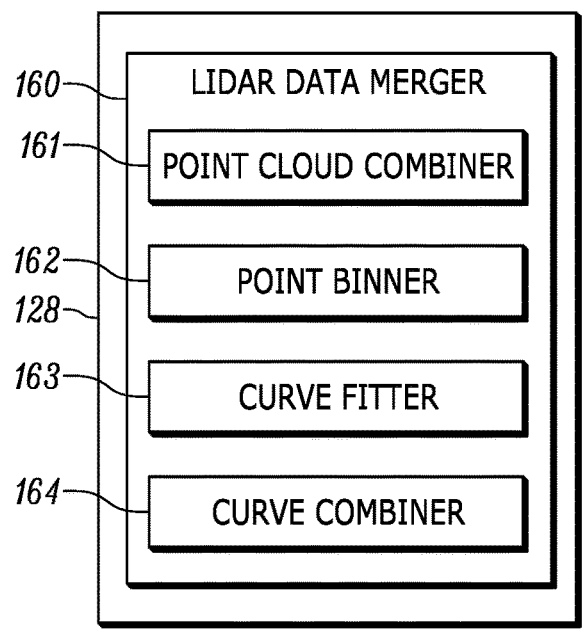
FIG. 1B is a block diagram of a control application in accordance with some embodiments.

Turning now to FIG. 1B, before describing the operation of the application 128 to control the navigation module 340, certain components of the application 128 will be described in greater detail. As will be apparent to those skilled in the art, in other examples the components of the application 128 may be separated into distinct applications, or combined into other sets of components. Alternatively, or in addition, some or all of the components illustrated in FIG. 4 may also be implemented as dedicated hardware components (e.g. one or more special purpose FPGAs and/or one or more ASICs connected to the controller 320).

The control application 128 includes a lidar data merger 160. In brief, the lidar data merger 160 is configured to merge two or more sets of lidar data and includes: point cloud combiner 161 configured to merge and/or combine two or more point clouds; a point binner 162 configured to bin points from a point cloud data set according to perpendicular planes; a curve fitter 163 configured to perform curve fitting and/or local curve fitting to produce curve fit points; and curve combiner 164 configured to combine curve fit points.

Figure 2:
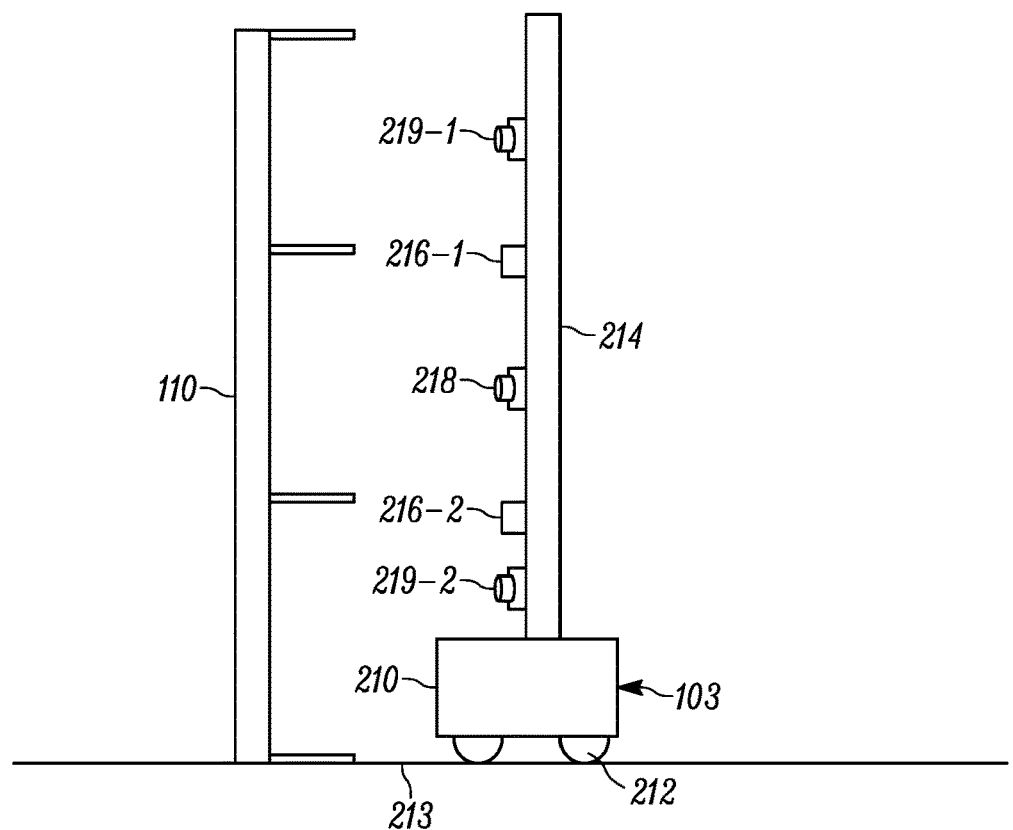
FIG. 2 is a side view of a block diagram showing a mobile automation apparatus angularly scanning a module using two vertically oriented lidar device in accordance with some embodiments.
Figure 3:
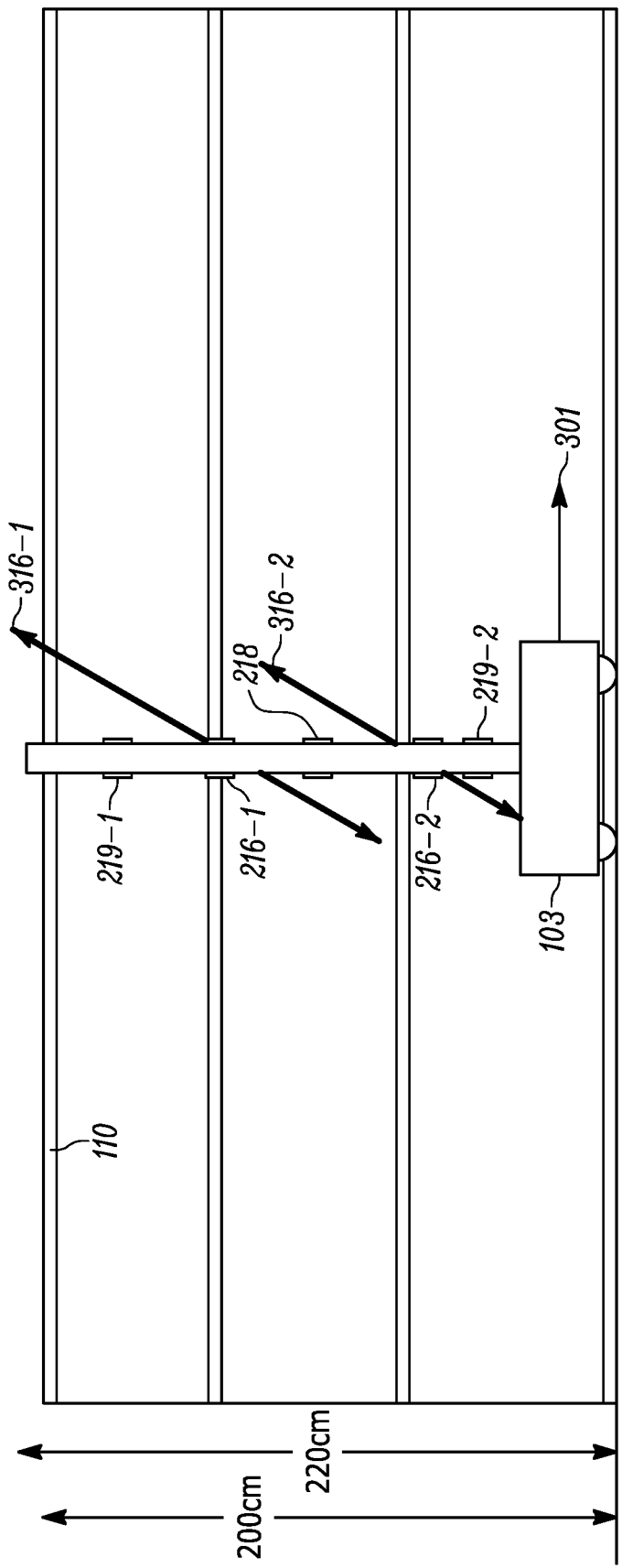
FIG. 3 is a perspective view of a block diagram showing a mobile automation apparatus angularly scanning a module using two vertically oriented lidar device in accordance with some embodiments.

Attention is next directed to FIG. 2 and FIG. 3 which respectively depict a schematic side view and a schematic perspective view of the apparatus 103 in operation relative to a module 110 of shelves located, for example, in a retail or warehousing environment. While the shelves of the module 110 are depicted as empty, the shelves are generally stocked with retail objects including, but not limited to, boxes, products for sale, and the like. Furthermore, while only one module 110 is depicted, the environment in which the module 110 is located will generally comprise a plurality of similar modules stocked with retail objects offered for sale. The apparatus 103 is generally configured to autonomously navigate the environment and acquire electronic data that is used to for one or more of stock detection, low stock detection, price label verification, plug detection (detection of SKU being in the wrong location), planogram compliance and the like.

With reference to FIG. 2, the mobile automation apparatus 103 generally comprises a base 210 configured to move on wheels 212 (e.g. on a floor 213 of the environment), and the like, with a mast 214, and the like, extending vertically upward from the base 210. The base 210 and the mast 214 are provisioned with various sensors for autonomously navigating in the environment in which the module 110 is located and various further sensors for acquiring electronic data associated with the module 110 used for one or more of stock detection, low stock detection, price label verification, plug detection, planogram compliance and the like.

As shown in FIG. 2, several sensors are depicted: a first lidar device 216-1, a second lidar device 216-2 and one or more cameras 218, 219-1, 219-2. The first lidar device 216-1 and the second lidar device 216-2 are referred to hereafter, collectively, as lidar devices 216 or, generically, as a lidar device 216. The cameras 219-1, 219-2 are referred to hereafter, collectively, as the camera 219 or, generically, as a camera 219. The lidar devices 216 are spaced vertically on the mast 214 such that respective lidar scans of the module 110 and/or the shelves of the module 110 at least partially overlap.

Indeed, attention is further directed to FIG. 3 which further depicts the apparatus 103 in operation relative to the module 110. Hence, the depiction of the apparatus 103 and the module 110 in FIG. 3 is rotated about 90° to the depiction in FIG. 2. Furthermore, while not all portions of the apparatus 103 are indicated in FIG. 3, they are nonetheless assumed to be present.

In particular, FIG. 3 depicts the lidar devices 216 scanning as represented by respective arrows 316-1, 316-2, and which further schematically represent respective regions which are being scanned; as described in further detail below. In particular the arrows 316-1, 316-2 represent boundaries of respective scanning regions of each lidar devices 216-1, 216-2. The arrows 316-1, 316-2 will be interchangeably referred to hereafter, collectively, as arrows 316, and generically as an arrow 316.

As depicted, the location of each of the lidar devices 216 on the mast 214 are selected such that the combined lidar scans of the lidar devices 216 (as represented by the arrows 316) image the entire vertical height of the module 110. For example, in specific embodiments, the module 110 is about 200 cm high, from the floor 213, and the top lidar device 216-1 is configured to scan to about 220 cm from the floor 213 (presuming the top shelf of the module 110 does not block the top lidar device 216-1). In general, the exact positions of each of the lidar devices 216 depends on which portions of the module 110 are to be imaged and the lidar devices 216 are positioned accordingly.

However, the exact dimensions and physical configuration of the lidar devices 216, and the respective regions being scanned by each, are generally configured for an environment into which the apparatus 103 is to be navigating.

Furthermore, while only two lidar devices 216 are depicted, in other embodiments the apparatus 103 comprises more than two lidar devices 216 with, for example, adjacent lidar devices 216 having overlapping lidar scans.

While not depicted, it is further assumed that the apparatus 103 comprises various internal components, such as a controller for generally controlling navigation and/or sensor functionality of the apparatus, as well as a communication interface configured to communicate with the server 101, and a memory. Such internal components, in some embodiments, include a navigation module and/or a motion module configured to navigate the apparatus 103 through the environment in which the module 110 is located for example according to a path, path segments, a map, and the like which, in various embodiments, is received from the server 101 or computed, in full or in part, at the mobile automation apparatus 103.

As depicted the camera 218 is located between the lidar devices 216 and is configured to acquire electronic images of at least a portion of the same region of the module 110 that is being scanned by the lidar devices 216. The electronic images acquired by the camera 218 will be referred to as camera data. The cameras 219 are located above and below the lidar devices 216.

While three cameras 218, 219 is depicted, in other embodiments, as few as one camera (e.g. camera 218), or more than three cameras are located along the mast 214, for example located at respective positions for acquiring images of textual prices, barcodes, and the like at the shelves of the module 110 and/or at positions for acquiring images of retail objects located on the shelves of the module 110.

The controller and/or the navigation module in the apparatus 103 generally navigates the apparatus 103 in a movement direction 301 (as indicated by an arrow extending from the apparatus 103) that is about parallel to, for example, a front of the module 110. The controller and/or the navigation module of the apparatus 103 controls the wheels 212 to navigate according to a path, path segments, a map, and the like.

As the apparatus 103 moves relative to the module 110, the lidar devices 216 each scan the module 110 at a non-zero and non-perpendicular angle to the movement direction 301, as indicated by arrows 316. In other words, the lidar devices 216 each scan the shelves of the module 110 at an angle to the movement direction 301 that is neither vertical nor horizontal relative to a plane of shelves of the module 110 and/or neither vertical nor horizontal relative to a ground plane (e.g. the plane of the floor 213. Put another way, the lidar devices 216 perform scanning (as represented by the arrows 316) in directions that are neither vertical nor horizontal relative to the shelves of the module 110. In this manner, gaps between retail objects are more easily detectable than if the scanning were vertical.

As is further apparent from FIG. 2 and FIG. 3, the lidar devices 216 are imaging the module 110 in a direction towards the module 110 that is perpendicular to the movement direction 301.

Furthermore, as the scanning by the lidar devices 216 occurs, each of the lidar devices 216 collects depth data at each point scanned such that, for each of the lidar devices 216, a respective set of point cloud data is acquired. Each point in each respective set of point cloud data is defined by a three-dimensional coordinate that locates the point in space relative, for example, to the lidar devices 216. Indeed, it is assumed that the geometry (e.g. positions and orientations) of each of the lidar devices 216 on the mast 214 are known, and that the lidar devices 216 have been calibrated.

A lidar device 216 generally operates by transmitting a laser pulse (e.g. an infrared laser pulse) towards the module 110 and a sensor (e.g. a light sensor and/or an infrared sensor) at the lidar device 216 measures a distance to a point of interaction with a surface of the module 110 using a time-of-flight measurement. As the angle of the laser pulse is known, and as the geometry of the lidar devices 216 are known, a position of where the laser pulse interacts the surface of the module 110 is determined and stored as a three-dimensional point using one or more of a polar coordinate system, a Cartesian coordinate system and the like. Such measurement occurs for a plurality of points along a plane that is perpendicular (e.g. towards the module 110) to the depicted arrows 316 (and which is angled, for example, with respect to the floor 213, the shelves of the module 110, and/or the mast 214).

Put another way, and assuming a Cartesian coordinate system for simplicity of explanation, each point scanned is associated with an "x" coordinate (e.g. horizontal) in the movement direction 301, a "y" coordinate (e.g. vertical) perpendicular to the movement direction 301, and a "z"

coordinate representing depth, for example from a plane perpendicular to the floor 213 along the movement direction 301.

Hence, the lidar devices 216 generally acquire respective sets of point cloud data, each point in each respective set of point cloud data associated with a three-dimensional coordinate that locates the point in space. Hence, each respective set of point cloud data obtained by a corresponding lidar device 216 represents a depth map of at least part of the module 110.

Furthermore, as the apparatus 103 moves in the movement direction 301, the lidar devices 216 are also moved in the movement direction 301 such that the lidar devices 216 each scan respective overlapping regions of the module 110. In general, the scanning occurs at a much faster rate than the movement of the apparatus 103, hence, as the apparatus 103 moves, it can be assumed, in some embodiments, that the scanning occurs at a fixed position.

Hence, in some embodiments, navigation data used to navigate the apparatus 103 is used as an input to define a position of each of the scans by the lidar devices 216 (e.g. relative to the module 110) such that data from subsequent scanning by the lidar devices 216 at subsequent positions for each of the lidar devices 216 (e.g. as moved by the apparatus 103) are combined into respective sets of point cloud data for the respective overlapping regions of the module 110. Put another way, the two respective overlapping regions which are scanned by the lidar devices 216 represent a combined larger region of the module 110.

In some embodiments, combining the individual scans acquired by the lidar devices 216, as the lidar devices 216 move along the module 110, occurs at the apparatus 103 while, in other embodiments, the navigation data is transmitted to the server 101 with acquired point cloud data for each scan and the combining occurs at the server 101.

It is further apparent that while the scanning in general overlaps (e.g. the regions being scanned by each of the lidar devices 216 overlap), the points being scanned by each of the lidar devices 216 generally do not coincide. That is, as the lidar devices 216 are moved along the movement direction 301, the points being scanned by each of the lidar devices 216 generally do not coincide. While some points could, in principle, coincide, the lidar devices 216 are not configured to perform coincidental scanning of points.

Indeed, lidar devices are generally one-dimensional sensors, and they scan an environment in parallel planes. When one lidar device is placed directly above another, as in FIG. 2, and both are scanning vertically (i.e. the scanning planes and/or scanning directions are perpendicular to the floor 213) then the scans will generally overlap (e.g. the scanning planes at least partially coincide). However, when the two lidar devices are scanning at an angle, as in FIG. 3, the scanning planes are parallel and are not coincident, as also depicted in FIG. 3; in this case, the scans do not overlap but the point clouds produced by the lidar devices can overlap if the regions being scanned by the lidar devices overlap, as is also the case in FIG. 3.

Similarly, the cameras 218, 219 are configured to acquire camera data over at least a portion of the combined region scanned by the lidar devices 216, as the apparatus 103 navigates in the movement direction 301, as each of the cameras 218, 219 is imaging in a direction towards the module 110 and/or perpendicular to the movement direction 301.

Figure 4:
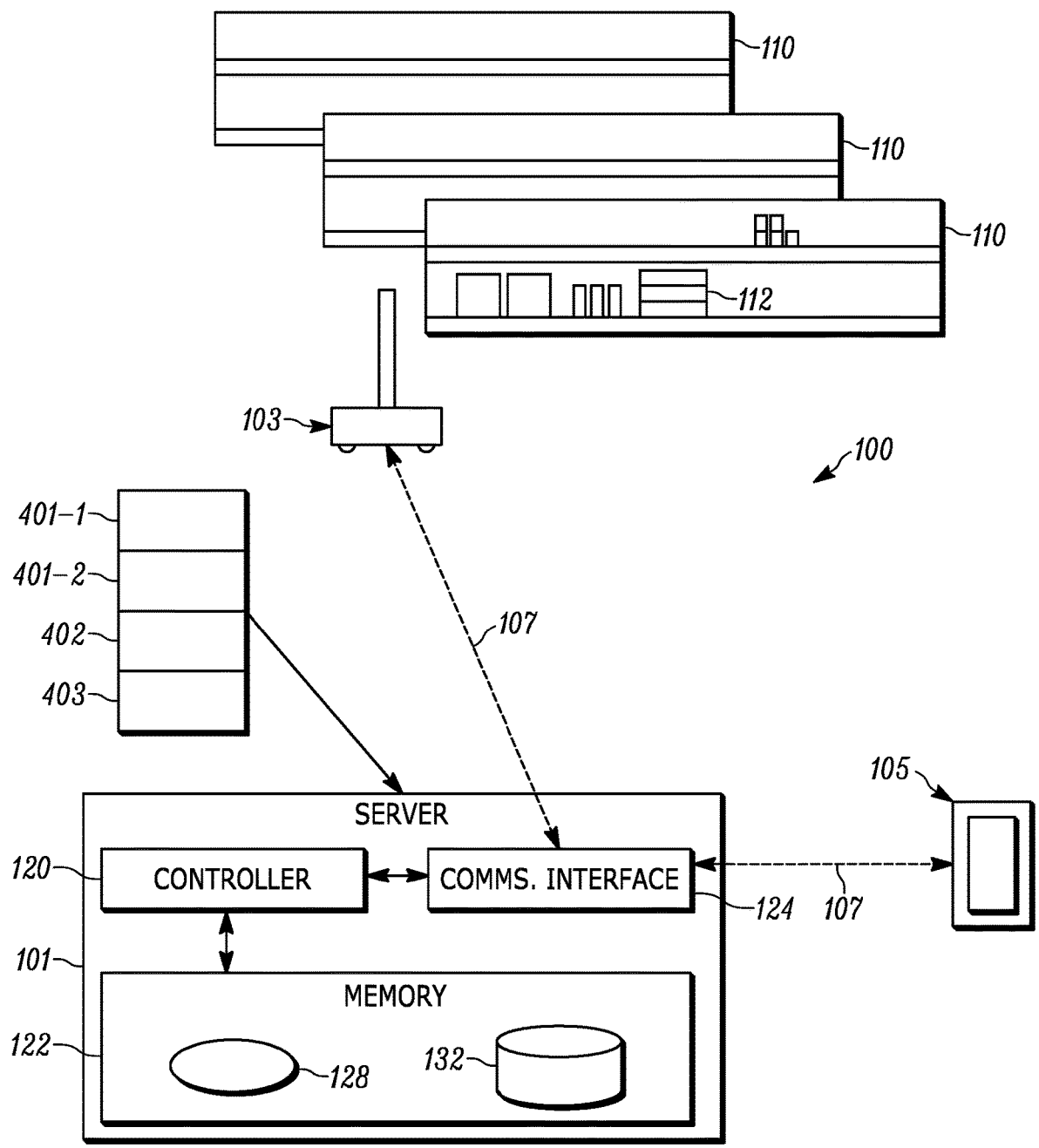
FIG. 4 depicts a mobile automation apparatus of the system of FIG. 1A communicating with a server in accordance with some embodiments.

Attention is next directed to FIG. 4 which is substantially similar to FIG. 1A, with like elements having like numbers. In particular, FIG. 4 depicts the apparatus 103 transmitting point cloud data 401-1, 401-2 to the server 101, the point cloud data 401-1, 401-2 collected by the lidar devices 216 as described above. For example, the point cloud data 401-1 is collected by the lidar device 216-1, and the point cloud data 401-2 is collected by the lidar device 216-2.

In some embodiments, the point cloud data 401-1, 401-2 is transmitted intermittently and/or periodically as the point cloud data 401-1, 401-2 is being collected by the lidar devices 216 (not depicted in FIG. 1) while, in other embodiments, the point cloud data 401-1, 401-201 is transmitted to the server 101 after the point cloud data 401-1, 401-2 is collected for the module 110, and/or alternatively, after all point cloud data has been collected for all modules in the environment through which the apparatus 103 is navigating.

In yet further embodiments, as depicted, the point cloud data 401-1, 401-2 is transmitted with navigation data 402. In these embodiments, the server 101 coordinates the points of individual scans in the point cloud data 401-1, 401-2 using positions of the apparatus 103 in the navigation data 402. In other words, the navigation data 402 indicates the position of the lidar devices 216, for example relative to the module 110, as the scanning occurs. For example, the navigation data 402, in some embodiments, comprises the position of the apparatus 103 as a function of time, and the point cloud data 401-1, 401-2 comprises points of the scanning and a time at which each scan occurred; the time in each set 401-1, 401-2, 402 is used to coordinate the position of the apparatus 103 with the positions of the scan to better locate each scanned point in a three-dimensional space. For example, a time when a scan occurred can be used as a lookup to see where the apparatus 103 was located in 3D space.

Furthermore, the navigation data 402 comprises a position of the apparatus 103 (e.g. relative to the module 110 and/or relative to the environment in which the module 110 is located and/or relative to a global position), as a function of time.

Either way, the server 101 receives, via the communication interface 124, the point cloud data 401-1, 401-2 representing respective angular lidar scans of a region as the at least two lidar devices 216 are moved relative the region, the respective angular lidar scans occurring at a non-zero and non-perpendicular angle to the movement direction 301.

As depicted, the apparatus 103 also transmits camera data 403 acquired by, for example, the camera 218 over at least a portion of the region represented by the point cloud data 401. However, transmission of the camera data 403 is optional in some embodiments. The camera data 403 includes, in some embodiments, the camera data from the cameras 219.

Figure 5:
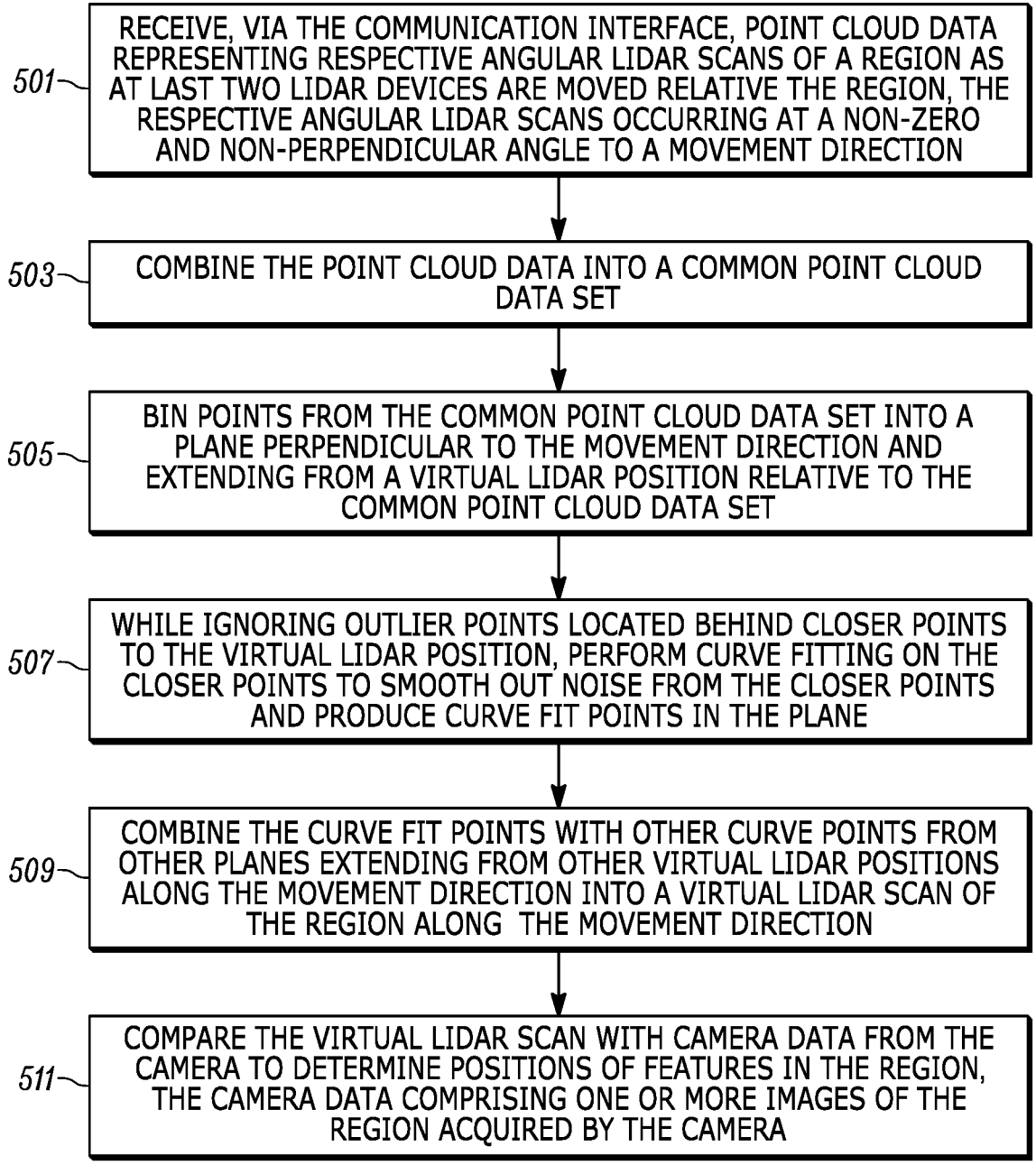
FIG. 5 is a flowchart of a method of merging lidar data in accordance with some embodiments.

Attention is now directed to FIG. 5 which depicts a flowchart representative of an example method 500 for merging lidar data. The example operations of the method 500 of FIG. 5 correspond to machine readable instructions that are executed by, for example, the server 101 of FIG. 1A, and specifically by the controller 120. Indeed, the example method 500 of FIG. 5 is one way in which the server 101 is specially configured. The following discussion of the example method 500 of FIG. 5 will lead to a further understanding of the server 101, and its various components. However, it is to be understood that in other embodiments, the server 101 and/or the method 500 are varied, and hence need not work exactly as discussed herein in conjunction with each other, and that such variations are within the scope of the present disclosure.

Furthermore, the example method 500 of FIG. 5 need not be performed in the exact sequence as shown and likewise, in other embodiments, various blocks may be performed in parallel rather than in sequence. Accordingly, the elements of method 500 are referred to herein as "blocks" rather than "steps." The example method 500 of FIG. 5 may be implemented on variations of the example server 101, as well.

It is further assumed in the method 500 that the geometry (e.g. positions and orientations) of each of the lidar devices 216 on the mast 214 are known, and that the lidar devices 216 have been calibrated.

In addition, the method 500 will be described with respect to a virtual lidar position and/or a virtual lidar device and/or a virtual lidar scan. In short, each of the lidar devices 216 has a position in three-dimensional space. The method 500 assumes that another lidar device (e.g. the virtual lidar devices) is also located at a given position (e.g. a virtual lidar position) in three-dimensional space and produce a respective lidar scan (e.g. the virtual lidar scan); that is a lidar scan that would be produced if a lidar device were located at the given position. Put another way, the method 500 produces a simulated and/or virtual lidar scan at a given position from two or more existing lidar scans.

At block 501, the server 101 and/or the controller 120 receives, via the communication interface 124, the point cloud data 401-1, 401-2 representing respective angular lidar scans of a region as the at least two lidar devices 216 are moved relative the region, the respective angular lidar scans occurring at a non-zero and non-perpendicular angle with respect to the movement direction 301.

At block 503, the server 101 and/or the controller 120 combines the point cloud data 401-1, 401-2 into a common point cloud data set (as further discussed in FIG. 6 and FIG. 7, below). The block 503 is performed, in some embodiments, using the point cloud combiner 161.

At block 505, the server 101 and/or the controller 120 bin points from the common point cloud data set into a plane perpendicular to the movement direction 301 and extending from a virtual lidar position relative to the common point cloud data set (as further discussed below, including in FIG. 8). In some embodiments, the virtual lidar position is position of the camera 218, however the virtual lidar position is at other positions in other embodiments. The block 505 is performed, in some embodiments, using the point binner 162.

At block 507, the server 101 and/or the controller 120, while ignoring outlier points located behind closer points to the virtual lidar position, performs local curve fitting on the closer points to smooth out noise from the closer points and produce curve fit points in the plane (as further discussed below, including in FIG. 11). The block 507 is performed, in some embodiments, using the curve fitter 163.

At block 509, the server 101 and/or the controller 120 combines the curve fit points with other curve points from other planes extending from other virtual lidar positions along the movement direction 301 into a virtual lidar scan of the region along the movement direction 301 (as further discussed below, including in FIG. 13). The block 509 is performed, in some embodiments, using the curve combiner 164.

At block 511, assuming the virtual lidar position is at the position of the camera 218, the server 101 and/or the controller 120 compares the virtual lidar scan with camera data from the camera 218 to determine positions of features in the region, the camera data comprising one or more images of the region acquired by the camera 218. Block 511 assumes that the virtual lidar position is located at a position of the camera 218; block 511 is optional in some embodiments.

As indicated above, the server 101 and/or the controller 120 receiving the point cloud data 401-1, 401-2, as in the block 501 of the method 500, is depicted in FIG. 4. The remaining blocks of the method 500 are next described with reference to FIG. 6 to FIG. 13.

Figure 6:
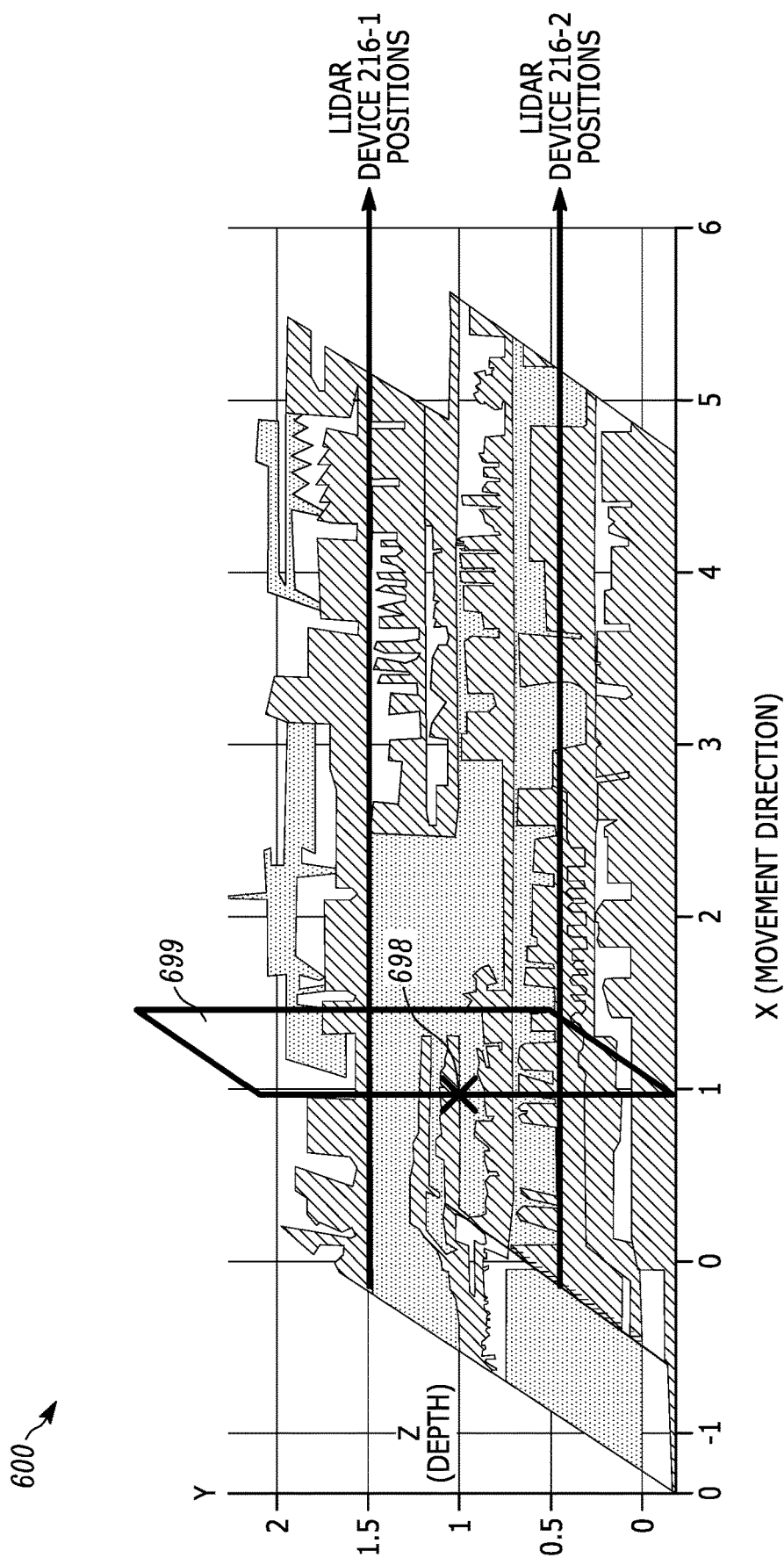
FIG. 6 depicts an example common point cloud data set and a plane at a virtual lidar position in accordance with some embodiments.
Figure 7:
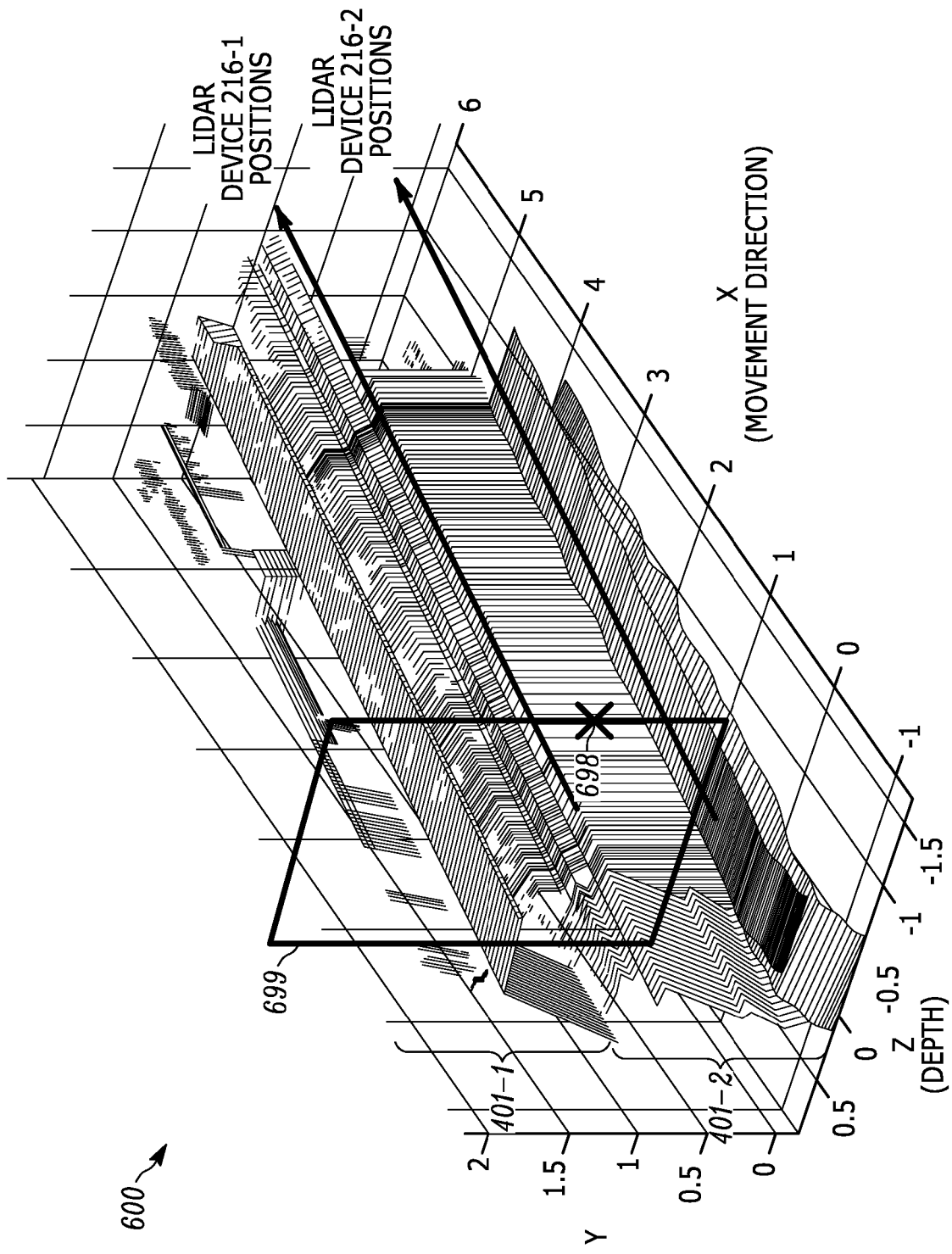
FIG. 7 depicts the example common point cloud data set and plane of FIG. 6 from another perspective in accordance with some embodiments.

FIG. 6 and FIG. 7 depict an example embodiment of the block 503 in which the server 101 and/or the controller 120 combines the point cloud data 401-1, 401-2 into a common point cloud data set 600, using the three-dimensional coordinates of each point in the point cloud data 401-1, 401-2. Put another way, the point cloud data 401-1, 401-2 are combined into a point cloud (e.g. the common point cloud data set 600) that includes the points of each set of point cloud data 401-1, 401-2. In some embodiments, the combining of the point cloud data 401-1, 401-2 into the common point cloud data set 600 occurs in a step-wise process, with individual set of lidar scanning data in the point cloud data 401-1, 401-2 first combined using the navigation data 402, with the result then combined into the common point cloud data set 600. However, in other embodiments, the combining occurs using the point cloud data 401-1, 401-2 and the navigation data 402 as inputs and the common point cloud data set 600 is generated from the individual lidar scanning data in each set of the point cloud data 401-1, 401-2, arranged in the common point cloud data set 600 using the navigation data 402.

In particular, FIG. 6 and FIG. 7 each depicts the common point cloud data set 600 in a Cartesian coordinate system, from different respective perspectives, with FIG. 6 depicting the common point cloud data set 600 from a similar perspective as that depicted in FIG. 3, while FIG. 7 depicts the common point cloud data set 600 rotated with respect to FIG. 6, to emphasize the depth of the points in the common point cloud data set 600. In each of FIG. 6 and FIG. 7 arrows depict the positions of each of the lidar devices 216-1, 216-2 relative to the common point cloud data set 600 as the lidar devices 216-1, 216-2 are moved, as described above.

Furthermore, in each of FIG. 6 and FIG. 7, an x-direction, a y-direction and a z-direction are indicated, with the x-direction corresponding to the movement direction 301, the y-direction being in the vertical direction of the module 110, and the z-direction representing depth into the module 110, perpendicular to both the x-direction and the y-direction. However, the x-direction, a y-direction and a z-direction can be arbitrary and indeed the common point cloud data set 600 can be represented in any orientation and/or any coordinate system.

Hence, the common point cloud data set 600 represents a depth map of the shelf module 110, and is a combination of the point cloud data 401-1, 401-2 which overlap. However, the point cloud data 401-1, 401-2 each includes shadows formed by the shelves of the module 110 (i.e. the lidar devices 216 each have portions of the module 110 shadowed by shelves).

Furthermore, the units of the common point cloud data set 600 correspond to physical units of the module 110, for example meters (e.g. as seen in FIG. 7, along the y-direction the common point cloud data set 600 is about 2 meters, or 200 cm, high as is the module 110, as depicted in FIG. 2). However, in other embodiments, the units are arbitrary and/or in another unit system.

While not depicted, the common point cloud data set 600 is generated at, and/or represented in, the controller 120 and/or is stored in the memory 122, for example as cached data.

As is also depicted in FIG. 6 and FIG. 7, the server 101 and/or the controller 120 locates a virtual lidar position 698 relative to the common point cloud data set 600. For example, in some embodiments, the virtual lidar position 698 is located at a position between the at least two lidar devices 216 relative to the common point cloud data set 600. In further embodiments, the virtual lidar position 698 is located at a position of a camera relative to the common point cloud data set 600, such as the position of the camera 218, also between the at least two lidar devices 216 relative to the common point cloud data set 600. However, the virtual lidar position 698 can be located anywhere relative to the common point cloud data set 600, for example at other camera positions (e.g. at a position of one of cameras 219) or other depth sensor positions above or below the at least two lidar devices 216, or between the at least two lidar devices 216. Indeed, in some embodiments, the virtual lidar position 698 is received at the server 101 as input, for example from an input device in communication with the server 101, and or transmitted by the mobile device 105.

When the virtual lidar position 698 is at a position of a camera, or other depth sensors, the curve fit points of block 509 are compared to depth data from the camera, or other depth sensor, for cross-reference and data checking, as described in further detail below.

FIG. 6 and FIG. 7 further depict a plane 699 perpendicular to the movement direction (e.g. along the y-direction and the z-direction) and extending from the virtual lidar position 698 relative to the common point cloud data set 600. The plane 699 represents a plane of a single virtual lidar scan (e.g. a vertical virtual lidar scan) by a virtual lidar device located at the virtual lidar position 698.

Figure 8:
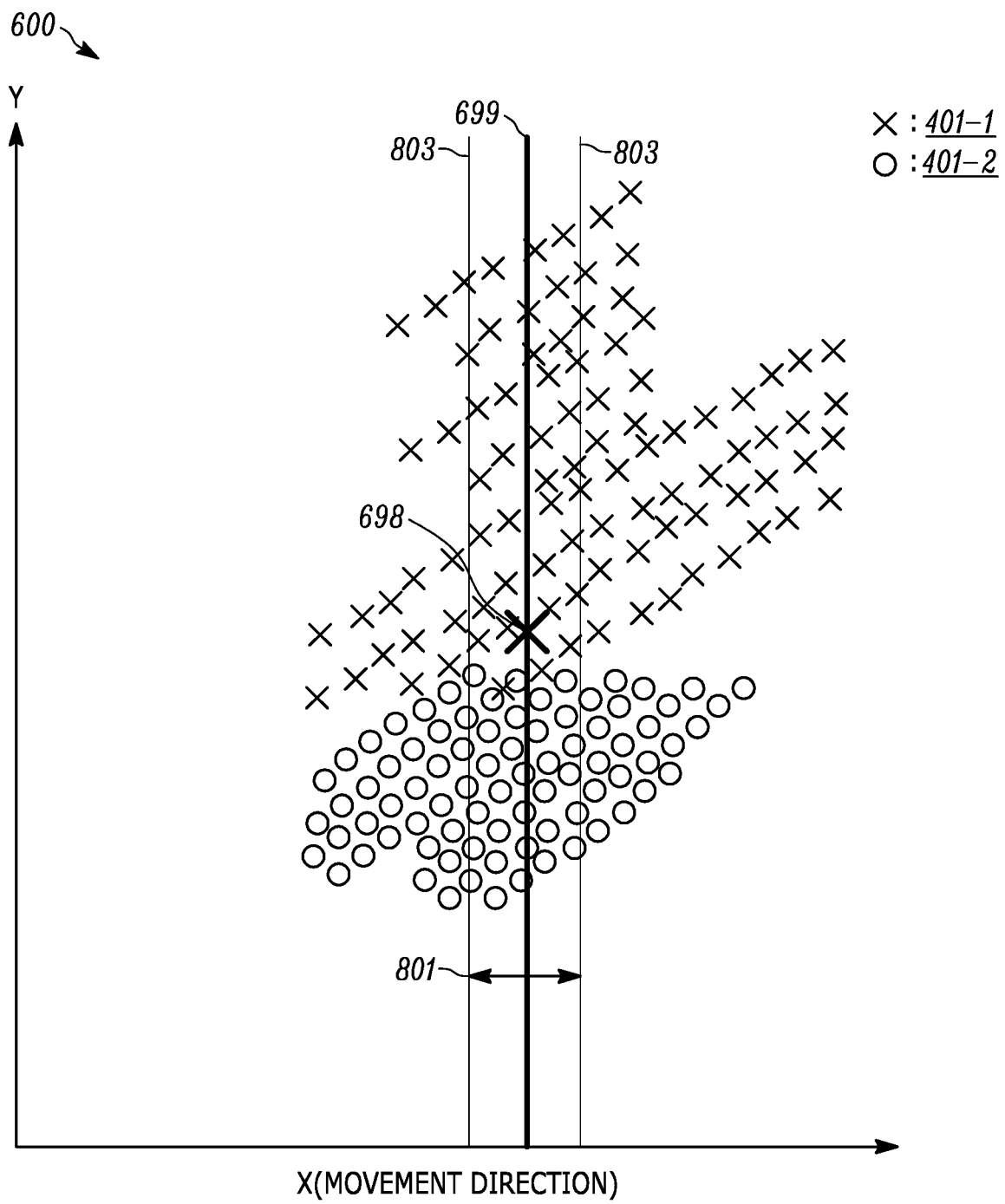
FIG. 8 depicts an example of binning points of the example common point cloud data set into the plane of FIG. 6 and FIG. 7 in accordance with some embodiments.

Attention is next directed to FIG. 8 which depicts an example embodiment of the block 505 of the method 500 in which points from the common point cloud data set 600 are binned into the plane 699 using, for example, a threshold distance 801 on either side of the plane 699 along x-direction (i.e. the movement direction 301). As depicted, the threshold distance 801 is a total distance across the plane 699 (e.g. representing a virtual thickness of the plane 699 in the x-direction), however, in other embodiments, the threshold distance 801 is defined as a distance that extends from either side of the plane 699 in the x-direction (e.g. half of the depicted threshold distance 801).

In particular, FIG. 8 depicts a schematic depiction of a portion the common point cloud data set 600, along an end of the plane 699 perpendicular to the x-direction, with the point cloud data 401-1 represented as crosses and the point cloud data 401-2 represented as circles. The location of the points in FIG. 8 do not necessarily correspond with points depicted in FIG. 6 and FIG. 7, as FIG. 8 illustrates schematically the binning of the block 505.

Furthermore, as the perspective in FIG. 8 is from an end of the plane 699 perpendicular to the x-direction, the plane 699 is depicted as a line, and each of the points of the common point cloud data set 600 appears as if collapsed onto a plane defined by the x-direction and the y-direction; in other words, the depth information is not depicted in FIG. 8.

In any event, the points that that are within the threshold distance 801 are binned into the plane 699; for example, in FIG. 8, points within parallel lines 803 on either side of the plane 699 at the limits of the threshold distance 801 are assumed to lie on the plane 699. Indeed, very few, if any, of the points in the common point cloud data set 600 will lie exactly on the plane 699 and the threshold distance 801 is used to control resolution of a final virtual lidar scan.

In some embodiments, the threshold distance 801 is selected based on one or more of: a desired resolution of the final virtual lidar scan that results from the method 500, a speed of the apparatus 103, a distance between adjacent points in the scanning, and the like. For example, when gaps of a given size between retail objects on shelves of the module 110 are to be detectable, the threshold distance 801 is set to less than the given size of a gap to be detected.

It is further understood that while the scanning is angular (e.g. not vertical or horizontal, as represented by the arrows 316) relative to the movement direction 301, the plane 699 is vertical to the movement direction 301, though the plane 699 may, in other embodiments, also be angular to the direction of movement.

Figure 9:
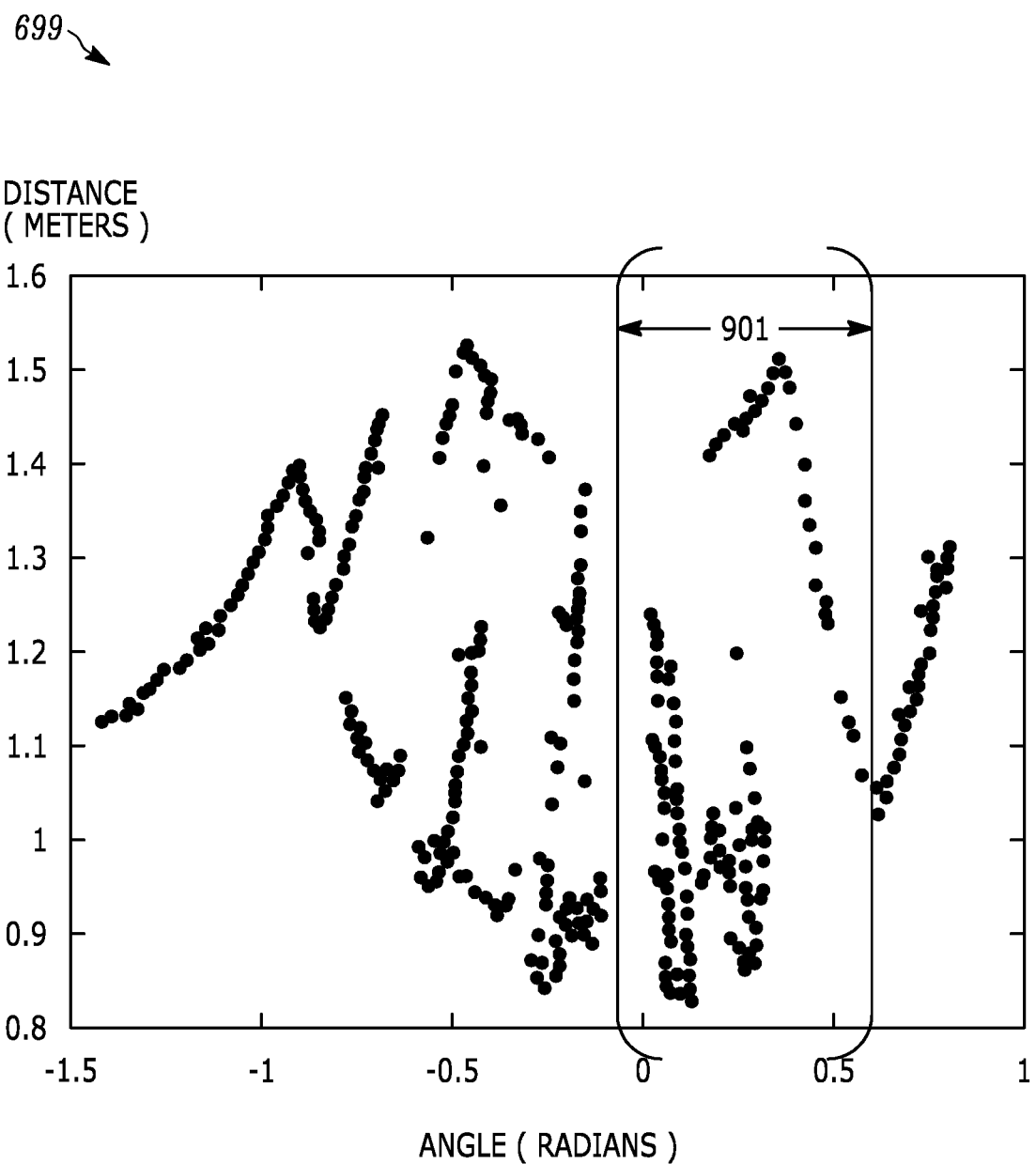
FIG. 9 depicts the binned points in polar coordinates in accordance with some embodiments.
Figure 10:
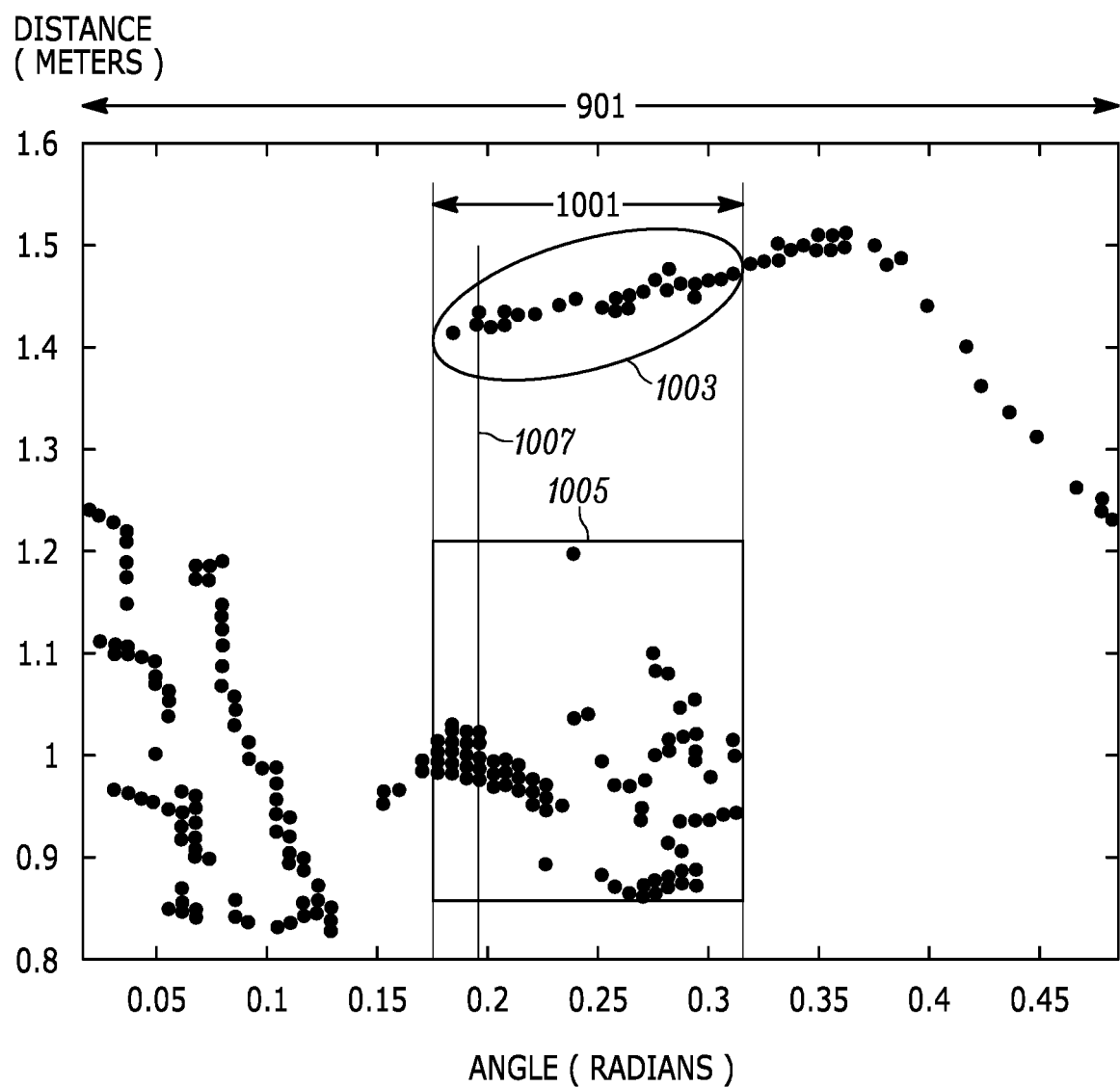
FIG. 10 depicts detail of the binned points of FIG. 9 in accordance with some embodiments.

Attention is next directed to FIG. 9 which depicts the plane 699 after the binning of the block 505 of the method 500. The points in the plane 699 are represented as two-dimensional polar coordinates, for example relative to the virtual lidar position 698 and assuming the virtual lidar device is performing a lidar scan from the virtual lidar position 698. Furthermore, the points in the plane 699 as depicted in FIG. 9 can be interchangeably referred as projected points as the points binned into the plane are "projected" onto the plane 699 using the threshold distance 801.

From FIG. 9 it is further apparent from at least the region 901 that some points lie behind other points, a consequence of each lidar device 216 imaging the shelves of the module 110 from different angles. For example, attention is directed to FIG. 10 which depicts detail of the region 901 of FIG. 9. In particular, in a region 1001, outlier points 1003 are located "behind" points 1005. Put another way, the outlier points 1003 each comprise a point that is further away from the virtual lidar position 698 than a respective closer point (e.g. one of points 1005) along a common line extending from the virtual lidar position 698 to the point and the respective closer point. For example, with reference to the line 1007, the outlier points 1003 located on the line 1007 are "behind" the points 1005 along the line 1007. As both the outlier points 1003 and the points 1005 both represent surfaces of the module 110, a lidar device located at the virtual lidar position 698 would only image a surface represented by the points 1005, and not a surface represented by the outlier points 1003 which would be located "behind" the surface represented by the points 1005 (relative to the lidar device located at the virtual lidar position 698). Hence, the outlier points 1003 are ignored at the block 507 of the method 500.

Figure 11:
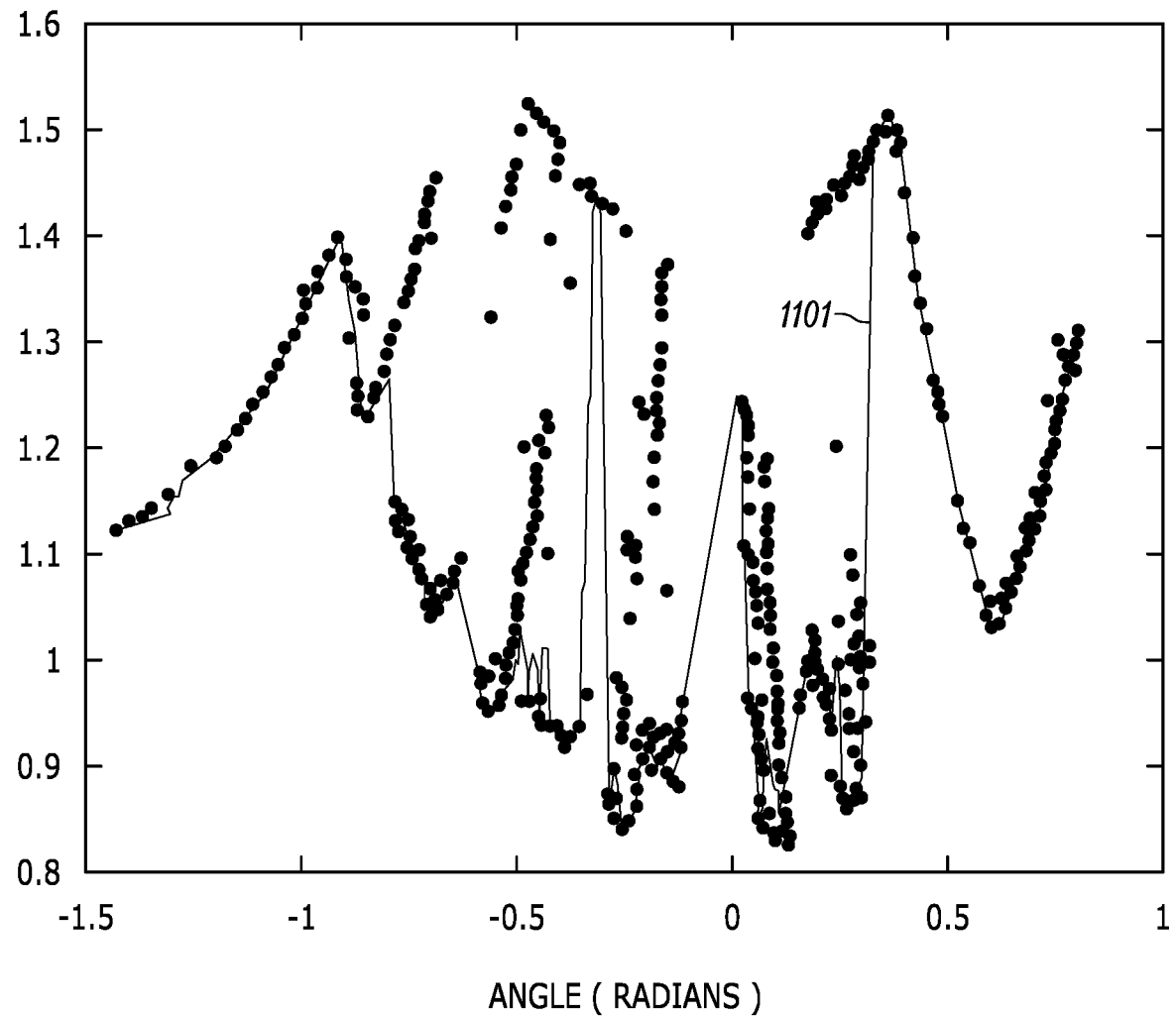
FIG. 11 depicts an example of local curve fitting on the binned points of FIG. 10 in accordance with some embodiments.
Figure 12:
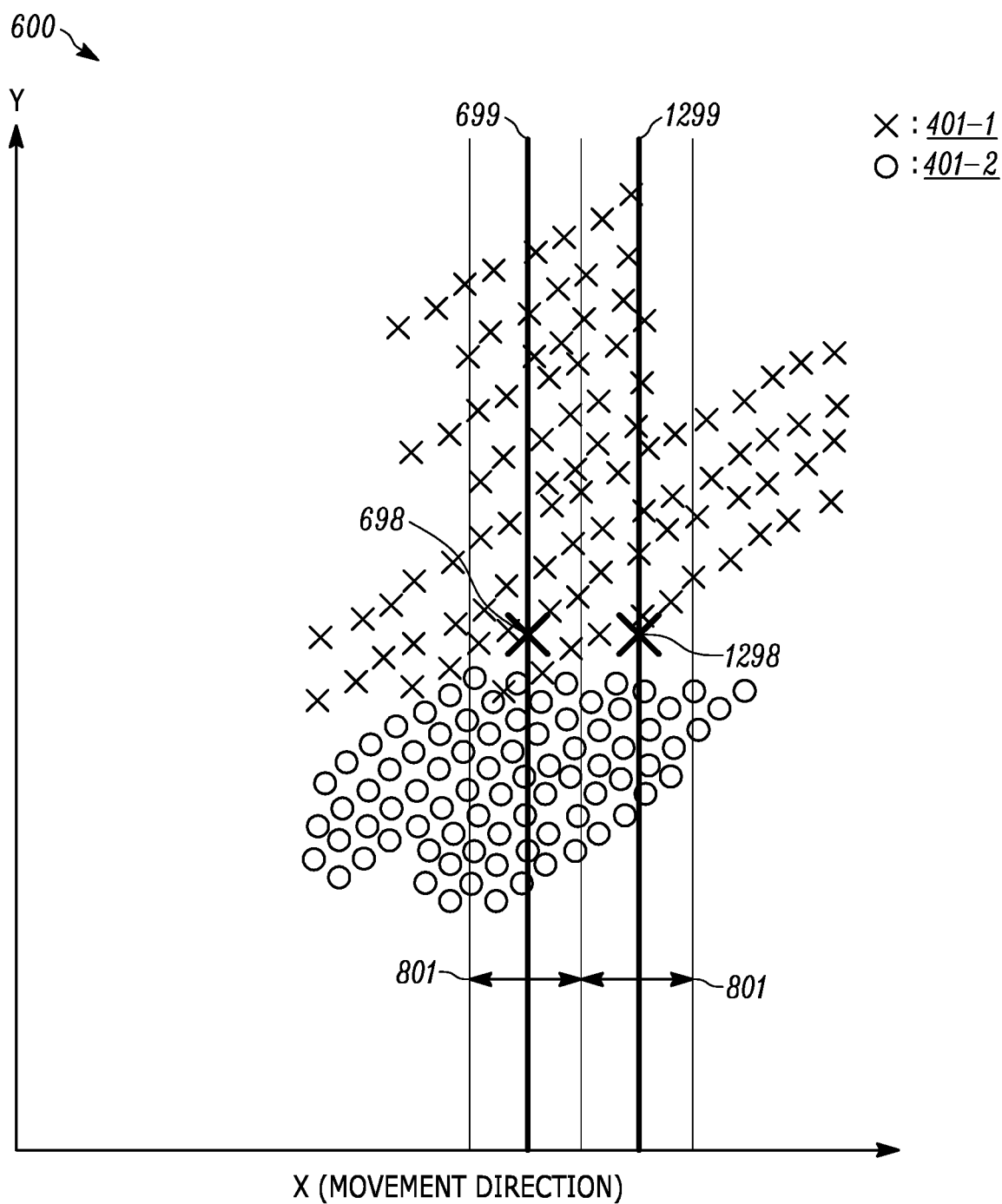
FIG. 12 depicts a further example of binning points in adjacent planes in accordance with some embodiments.

Indeed, attention is next directed to FIG. 11 which depicts an example embodiment of the block 507 of the method 500 in which curve fitting (and/or local curve fitting) occurs. In particular, FIG. 11 depicts how the server 101 and/or the controller 120, while ignoring outlier points (e.g. the outlier points 1003) located behind closer points (e.g. the points 1005) to the virtual lidar position 698, performs local curve fitting on the closer points to smooth out noise from the closer points. This produces curve fit points in the plane. The local curve fitting occurs in sections over the points and includes, but is not limited to, noise filtering. In other words, the local curve fitting results in locally smoothing the lidar scan data, while ignoring the outlier points.

Indeed, various local curve fitting technique are within the scope of present disclosure, including, but not limited to, polynomial local curve fitting techniques, interpolation techniques, regression techniques, and the like. Furthermore, the local curve fitting occurs over multiple segments of the points depicted in FIG. 11, for example over segments where abrupt changes in point positions do not occur (e.g. using threshold techniques and the like) and/or where other changes in point position behavior do not occur.

As depicted the server 101 and/or the controller 120 performs curve fitting on the plane depicted in FIG. 9, ignoring any outlier points, the fit curves represented in FIG. 11 as solid lines 1101. The solid lines 1101 hence represent surfaces that are visible and/or can be imaged by a lidar device located at the virtual lidar position 698. The server 101 and/or the controller 120 further populates curve fit points along the solid lines 1101 as curve fit points, each of the curve fit points representing a depth measurement by the lidar device located at the virtual lidar position 698 in the plane 699.

Indeed, output from the local curve fitting results in a discontinuous curve (e.g. the discontinuities corresponding to corners, shelves, and the like of the module 110), in polar coordinates, that is functionally identical to lidar data returned from a physical lidar device located at the virtual lidar position 698.

In general, the block 503 and the block 505 are repeated for a plurality of virtual lidar positions along the common point cloud data set 600, for example along a line in the movement direction 301. For example, attention is directed to FIG. 12, which is substantially similar to FIG. 8, with like elements having like numbers. However, FIG. 12 further depicts a second virtual lidar position 1298 located at an end view of a second plane 1299, parallel and adjacent to the plane 699, and separated by the threshold distance 801. For example, it is assumed that the virtual lidar device has moved from the virtual lidar position 698 to the virtual lidar position 1298 and scanning occurs in the plane 1299.

The threshold distance on either side of the plane 1299 is also indicated using lines, similar to FIG. 8. The binning of points within the threshold distance 801 is repeated for the plane 1299, as is the curve fitting (again ignoring outlier points) for the plane 1299. Indeed, binning of points within the threshold distance 801 is repeated for a plurality of planes, as is the curve fitting (again ignoring outlier points) for each of the plurality of planes, for example along the length of the module 110 as represented by the common point cloud data set 600 in order to produce, for example, a virtual lidar scan of the entire module 110 as if a physical lidar device located at each of the virtual lidar positions was moved along the module 110 by the apparatus 103. However, in other embodiments, only a portion of the module 110 is virtually imaged in this manner.

Figure 13:
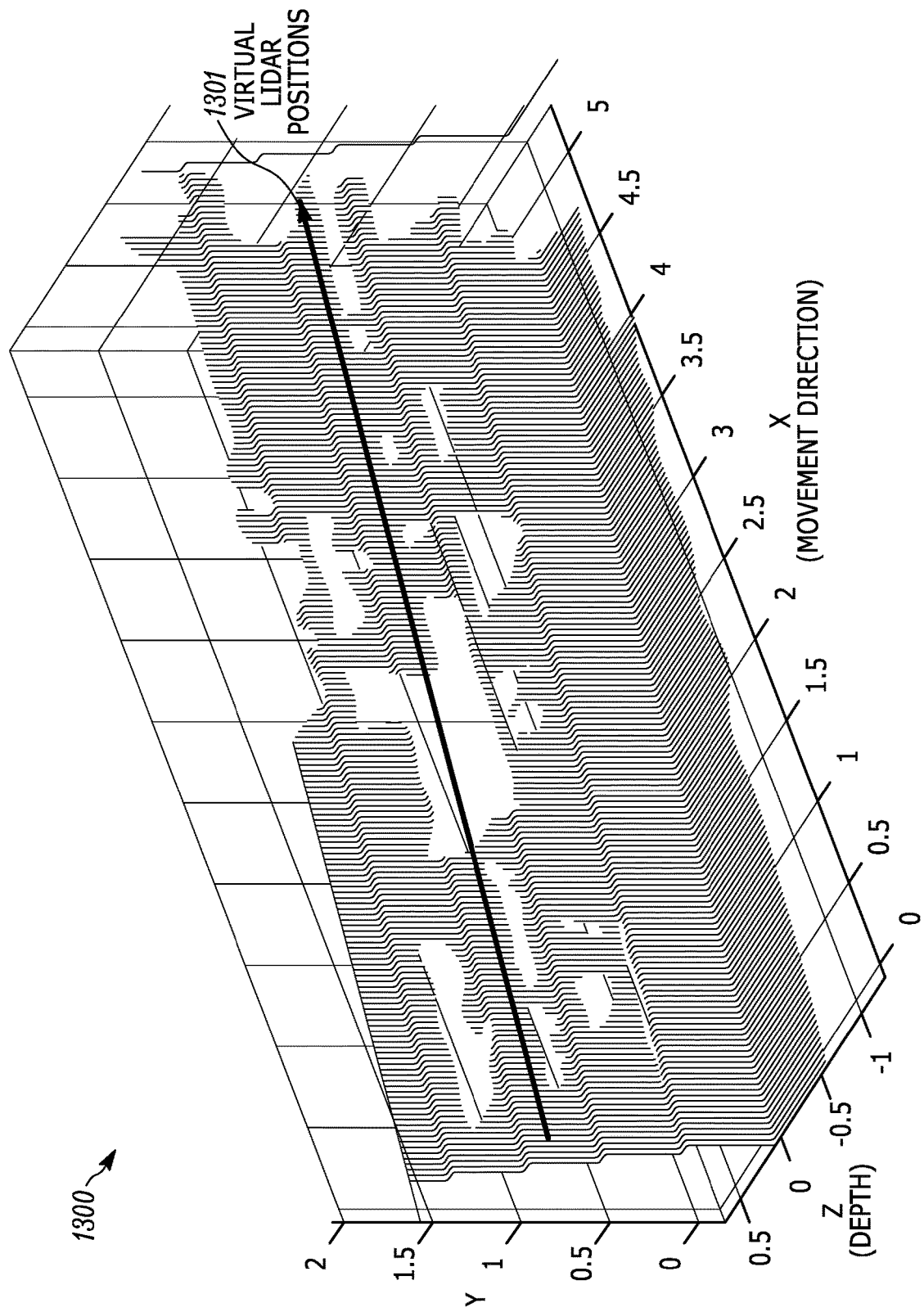
FIG. 13 depicts virtual lidar scan in accordance with some embodiments.

Attention is next directed to FIG. 13 which depicts an example embodiment of the block 509 of the method 500 in which the server 101 and/or the controller 120 combines the curve fit points (e.g. as generated using the curve fitting depicted in FIG. 11) with other curve points from other planes extending from other virtual lidar positions along the movement direction 301 into a virtual lidar scan 1300 of the region along the movement direction 301. For example, the curve fit points associated with the plane 699 are combined with the adjacent curve fit points from the plane 1299, and with other curve fit points from other planes to produce the virtual lidar scan 1300.

Indeed, the virtual lidar scan 1300 represents a point cloud data set that would have been acquired had a lidar device scanned the module 110 from positions corresponding to the camera 218, as the lidar device was moved in the movement direction 301, as indicated by the arrow 1301 in FIG. 13. Comparing the virtual lidar scan 1300 with the common point cloud data set 600 as depicted in FIG. 7, the virtual lidar scan 1300 is about 150 cm (e.g. 1.5 meters) high, as compared to the common point cloud data set 600 which is about 200 cm (e.g. 2 meters) high, as the second uppermost shelf of the module 110 would have blocked the lidar device from imaging surfaces of the module 110 above this shelf.

Furthermore, noise has been filtered from the virtual lidar scan 1300 as compared to the common point cloud data set 600.

In some embodiments, for example when the virtual lidar position 698 is at a location of the camera 218, the virtual lidar scan 1300 is compared (e.g. at the block 511 of the method 500) to the camera data 403, for example to cross-reference positions of retail objects on shelves, gap sizes between retail objects and the like.

However, a virtual lidar scan can be generated from any virtual lidar position relative to the common point cloud data set 600, for example at any camera location and/or any depth sensor location along the mast 214.

Hence, once the common point cloud data set 600 is generated, the remaining blocks of the method 500 are used to generate a virtual lidar scan from any position for which a lidar scan is desired, and which can then be used to generate further information about the module 110 and/or any area being scanned. Furthermore, the blocks 505 to 509 can be repeated for other virtual lidar positions.

Furthermore, the virtual lidar scan is useable in any technique used in a retail environment, and the like, which relies upon depth data for one or more of: out of stock detection, low stock detection, price label verification, plug detection and planogram compliance.

Furthermore, while the techniques described herein have been described with respect to two lidar devices, the techniques described herein are applicable to a plurality of lidar devices (e.g. more than two lidar devices).

Figure 14:
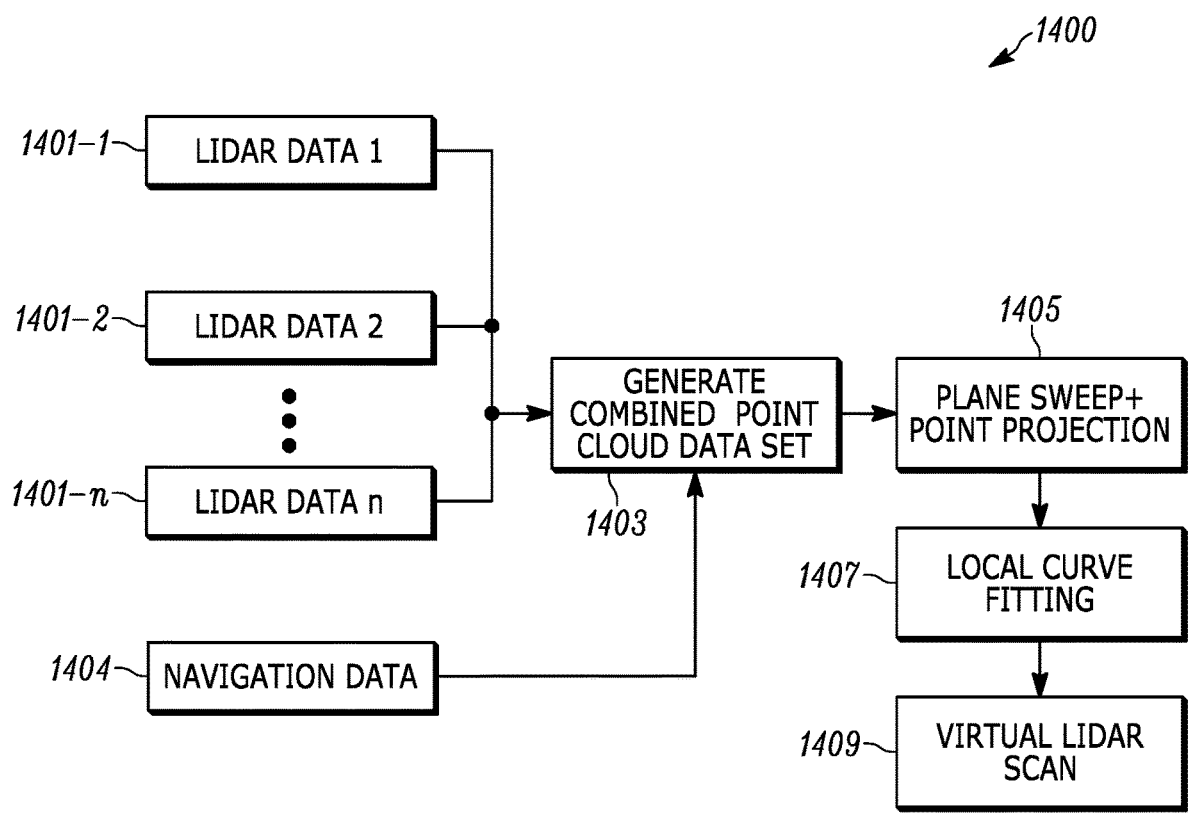
FIG. 14 is a flowchart of a method of merging lidar data, in accordance with some embodiments.

For example, with reference to FIG. 14, which depicts a schematic block diagram of a method 1400 of merging lidar data, lidar data 1401-1, 1401-2 . . . 1401-*n*, from "n" number of lidar devices are combined (e.g. at a block 1403) into a combined point cloud data set using, in some embodiments, navigation data 1404. A plane sweep (e.g. over a plurality of planes similar to planes 699, 1299) occurs at a block 1405 and point projection occurs at each of the plurality of planes (e.g. as in FIG. 8 to FIG. 10). Local curve fitting (e.g. as in FIG. 11) occurs at a block 1407 for each of the plurality of planes, and curved fit points from the local curve fitting are combined into a virtual lidar scan at a block 1409. In general, the block 1403 is similar to the block 503 of the method 500, the block 1405 is similar to the block 505 of the method 500, the block 1407 is similar to the block 507 of the method 500, and the block 1409 is similar to the block 509 of the method 500. Indeed, the method 1400 is generally similar to the method 500, but genialized for "n" lidar devices and/or "n" sets of lidar data.

Furthermore, while it has been assumed that the planes 699, 1299 represent vertical virtual lidar scans, the techniques described herein can be applied in any direction relative to the common point cloud data set 600 including vertically, horizontally or at any angle therebetween. Indeed, the angle of the planes through the common point cloud data set 600 generally correspond to a scanning direction of the virtual lidar device.

Hence, described herein is a device and method in which lidar sensor data from a plurality of lidar devices is combined into a virtual lidar scan. Put another way, sensor data from a plurality of lidar devices is pre-processed into a virtual lidar scan useable by other algorithms and/or techniques as input which can generally obviate a need to otherwise modify those techniques to consider a system and/or device performing lidar scanning with a plurality of lidar devices.

A plurality of lidar data, representing a plurality of lidar scans are combined, for example using navigation data of an apparatus moving the lidar devices, into a virtual lidar scan "performed" by a single virtual lidar device. In some embodiments, such techniques also include noise filtering, that is not always easy to implement when processing lidar data from a single lidar device.

As described above, plurality of lidar scans from the physical lidar devices are combined into a common (three-dimensional) point cloud data set, for example using the navigation data. A plane representing a scan of the virtual lidar device is "swept" through the common point cloud data set, and points of the common point cloud data set that are "close" to the plane are binned into the plane (e.g. as a projected point set) using desired virtual lidar device position and orientation. For example, ignoring the depth coordinate, the points are binned into the plane using a threshold distance from the plane.

The projected point set for the plane is two-dimensional and represents a single lidar scan from the virtual lidar position in the plane. In the projected point set, some data points (e.g. outlier points) may be located "behind" other data points, which, under normal operating conditions, generally cannot and/or does not occur for a physical lidar device (e.g. as objects block the lasers from the lidar devices). Hence, local curve fitting occurs along the points closest to the virtual lidar's position, and ignoring the outlier points. Such ignoring of the outlier points can be referred to as "occlusion check" such that the resulting virtual lidar scan is consistent with a physical lidar device. As local curve fitting occurs over multiple data points, local curve fitting is also used to as a filter to smooth out noise from the original lidar scans. Indeed, output from the local curve fitting can result in a discontinuous curve (e.g. the discontinuities corresponding to corners, shelves and like), for example in polar coordinates, that is functionally identical to lidar data returned from a physical lidar located at the virtual lidar position. The output is combined with the output from other planes in the common point cloud data set as a virtual lidar scan, and can be used for example, with other techniques, such as shelf detection technique, that use lidar scan data from a single lidar device as input.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

Moreover, relational terms in this document, such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A device comprising:
a lidar imaging controller and a communication interface, the controller configured to:
receive, via the communication interface, point cloud data representing respective angular lidar scans of a region as at least two lidar devices are moved relative the region, the respective angular lidar scans occurring at a non-zero and non-perpendicular angle to a movement direction;
combine the point cloud data into a common point cloud data set;
bin points from the common point cloud data set into a plane perpendicular to the movement direction and extending from a virtual lidar position relative to the common point cloud data set;
while ignoring outlier points located behind closer points to the virtual lidar position, perform curve fitting on the closer points to smooth out noise from the closer points and produce curve fit points in the plane; and
combine the curve fit points with other curve points from other planes extending from other virtual lidar positions along the movement direction into a virtual lidar scan of the region along the movement direction.

2. The device of claim 1, wherein the controller is further configured to combine the point cloud data into the common point cloud data set using navigational data of an apparatus moving the at least two lidar devices in the movement direction.

3. The device of claim 1, wherein the controller is further configured to bin the points from the common point cloud data set into the plane perpendicular to the movement direction using a threshold distance.

4. The device of claim 1, wherein the outlier points each comprise a point that is further away from the virtual lidar position than a respective closer point along a common line extending from the virtual lidar position to the point and the respective closer point.

5. The device of claim 1, wherein the virtual lidar position is located at a position between the at least two lidar devices relative to the common point cloud data set.

6. The device of claim 1, wherein the virtual lidar position is located at a position of a camera relative to the common point cloud data set.

7. The device of claim 6, wherein the position of the camera is between the at least two lidar devices relative to the common point cloud data set.

8. The device of claim 6, wherein the controller is further configured to compare the virtual lidar scan with camera data from the camera to determine positions of features in the region, the camera data comprising one or more images of the region acquired by the camera.

9. The device of claim 1, wherein each point of the plane is represented in polar coordinates.

10. A method comprising:
at a device comprising a lidar imaging controller and a communication interface, receiving, via the communication interface, point cloud data representing respective angular lidar scans of a region as at least two lidar devices are moved relative the region, the respective angular lidar scans occurring at a non-zero and non-perpendicular angle to a movement direction;
combining, using the controller, the point cloud data into a common point cloud data set;
binning, using the controller, points from the common point cloud data set into a plane perpendicular to the movement direction and extending from a virtual lidar position relative to the common point cloud data set;
while ignoring outlier points located behind closer points to the virtual lidar position, performing, using the controller, curve fitting on the closer points to smooth out noise from the closer points and produce curve fit points in the plane; and
combining, using the controller, the curve fit points with other curve points from other planes extending from other virtual lidar positions along the movement direction into a virtual lidar scan of the region along the movement direction.

11. The method of claim 10, further comprising combining the point cloud data into the common point cloud data set using navigational data of an apparatus moving the at least two lidar devices in the movement direction.

12. The method of claim 10, further comprising binning the points from the common point cloud data set into the plane perpendicular to the movement direction using a threshold distance.

13. The method of claim 10, wherein the outlier points each comprise a point that is further away from the virtual lidar position than a respective closer point along a common line extending from the virtual lidar position to the point and the respective closer point.

14. The method of claim 10, wherein the virtual lidar position is located at a position between the at least two lidar devices relative to the common point cloud data set.

15. The method of claim 10, wherein the virtual lidar position is located at a position of a camera relative to the common point cloud data set.

16. The method of claim 15, wherein the position of the camera is between the at least two lidar devices relative to the common point cloud data set.

17. The method of claim 15, further comprising comparing the virtual lidar scan with camera data from the camera to determine positions of features in the region, the camera data comprising one or more images of the region acquired by the camera.

18. The method of claim 10, wherein each point of the plane is represented in polar coordinates.

19. A non-transitory computer-readable medium storing a computer program, wherein execution of the computer program is for:
at a device comprising a lidar imaging controller and a communication interface, receiving, via the communication interface, point cloud data representing respective angular lidar scans of a region as at least two lidar devices are moved relative the region, the respective angular lidar scans occurring at a non-zero and non-perpendicular angle to a movement direction;

combining, using the controller, the point cloud data into a common point cloud data set;

binning, using the controller, points from the common point cloud data set into a plane perpendicular to the movement direction and extending from a virtual lidar position relative to the common point cloud data set;

while ignoring outlier points located behind closer points to the virtual lidar position, performing, using the controller, curve fitting on the closer points to smooth out noise from the closer points and produce curve fit points in the plane; and combining, using the controller, the curve fit points with other curve points from other planes extending from other virtual lidar positions along the movement direction into a virtual lidar scan of the region along the movement direction.

* * * * *